(12) United States Patent
Al-Hamad et al.

(10) Patent No.: US 10,302,669 B2
(45) Date of Patent: May 28, 2019

(54) METHOD AND APPARATUS FOR SPEED OR VELOCITY ESTIMATION USING OPTICAL SENSOR

(71) Applicant: InvenSense, Inc., San Jose, CA (US)

(72) Inventors: Amr Al-Hamad, Calgary (CA); Bashir Kazemipur, Calgary (CA); Jacques Georgy, Calgary (CA); Zainab Syed, Calgary (CA); Christopher Goodall, Calgary (CA)

(73) Assignee: InvenSense, Inc., San Jose, CA (US)

( * ) Notice: Subject to any disclaimer, the term of this patent is extended or adjusted under 35 U.S.C. 154(b) by 136 days.

(21) Appl. No.: 15/266,241

(22) Filed: Sep. 15, 2016

(65) Prior Publication Data

US 2017/0004630 A1 Jan. 5, 2017

Related U.S. Application Data

(63) Continuation-in-part of application No. 14/530,494, filed on Oct. 31, 2014.
(Continued)

(51) Int. Cl.
| *G06T 7/20* | (2017.01) |
| *G06T 7/00* | (2017.01) |
| *G01P 3/36* | (2006.01) |
| *G01C 21/20* | (2006.01) |
| *G01S 19/39* | (2010.01) |
| *G01S 19/45* | (2010.01) |

(Continued)

(52) U.S. Cl.
CPC .............. *G01P 3/36* (2013.01); *G01C 21/206* (2013.01); *G01S 5/16* (2013.01); *G01S 5/163* (2013.01); *G01S 11/12* (2013.01); *G01S 19/39* (2013.01); *G01S 19/45* (2013.01); *G01S 19/49* (2013.01); *G06T 7/20* (2013.01); *G06T 7/248* (2017.01); *G06T 7/269* (2017.01); *G06T 7/74* (2017.01); *G06T 2207/20021* (2013.01); *H04M 2203/551* (2013.01)

(58) Field of Classification Search
CPC ...... G01C 21/00; G01C 21/20; G01C 21/206; G01C 11/02; G01C 21/165; G01C 21/3652; G01C 21/3664; G01C 21/3685; H04W 4/02; H04W 4/025; H04W 4/026; H04W 4/028; H04W 4/16; H04W 4/185; H04W 4/206; H04W 4/22; H04W 64/006; H04W 88/02
See application file for complete search history.

(56) References Cited

U.S. PATENT DOCUMENTS

| 7,672,776 B2 * | 3/2010 | Skarine ................. G06F 1/1616 701/431 |
| 2005/0130677 A1 * | 6/2005 | Meunier ................. G01S 5/021 455/456.6 |

(Continued)

*Primary Examiner* — Hussein Elchanti
*Assistant Examiner* — Paul A Castro
(74) *Attorney, Agent, or Firm* — Bay Area Technology Law Group PC

(57) ABSTRACT

Systems and methods are disclosed for estimating speed and/or velocity for a portable device using an optical sensor. The optical sensor may capture a plurality of samples to be processed to estimate speed. The speed or velocity may be estimated based on a determined context and/or usage of the portable device. The estimated speed or velocity may be used to supplement other navigational solutions or may be used independently.

44 Claims, 29 Drawing Sheets

Related U.S. Application Data

(60) Provisional application No. 62/219,100, filed on Sep. 15, 2015, provisional application No. 61/898,824, filed on Nov. 1, 2013.

(51) Int. Cl.
| | | |
|---|---|---|
| *G01S 5/16* | (2006.01) | |
| *G01S 11/12* | (2006.01) | |
| *G01S 19/49* | (2010.01) | |
| *G06T 7/73* | (2017.01) | |
| *G06T 7/246* | (2017.01) | |
| *G06T 7/269* | (2017.01) | |

(56) References Cited

U.S. PATENT DOCUMENTS

| | | | | |
|---|---|---|---|---|
| 2006/0177103 | A1* | 8/2006 | Hildreth | G06F 1/1626 |
| | | | | 382/107 |
| 2013/0002854 | A1* | 1/2013 | Nielsen | H04N 7/183 |
| | | | | 348/94 |
| 2013/0102419 | A1* | 4/2013 | Jeffery | A63B 69/00 |
| | | | | 473/409 |
| 2013/0310110 | A1* | 11/2013 | Forutanpour | H04W 88/02 |
| | | | | 455/556.1 |
| 2014/0078275 | A1* | 3/2014 | Joao | G08B 21/02 |
| | | | | 348/61 |
| 2014/0226864 | A1* | 8/2014 | Venkatraman | G01C 21/20 |
| | | | | 382/107 |
| 2014/0257766 | A1* | 9/2014 | Poduri | G06N 7/005 |
| | | | | 703/2 |

* cited by examiner

METHOD AND APPARATUS FOR SPEED OR VELOCITY ESTIMATION USING OPTICAL SENSOR

CROSS REFERENCE TO RELATED APPLICATIONS

This application claims priority from and benefit of U.S. Provisional Patent Application Ser. No. 62/219,100, filed Sep. 15, 2015, which is entitled "SPEED AND VELOCITY ESTIMATION USING A SMARTPHONE CAMERA," and is a continuation-in-part of U.S. patent application Ser. No. 14/530,494, filed Oct. 31, 2014, which is entitled "SYSTEMS AND METHODS FOR OPTICAL SENSOR NAVIGATION" and claims priority to U.S. Provisional Patent Application Ser. No. 61/898,824, filed Nov. 1, 2013, entitled "METHOD AND APPARATUS FOR VISION-BASED AND VISION-AIDED PORTABLE NAVIGATION," all of which are assigned to the assignee hereof and are incorporated by reference in their entirety.

FIELD OF THE PRESENT DISCLOSURE

This disclosure generally relates to navigation techniques employing a portable device and more specifically to navigational constraints determined using an optical sensor.

BACKGROUND

Portable electronic devices, such as those configured to be handheld or otherwise associated with a user, are employed in a wide variety of applications and environments. The ubiquity of such devices as mobile phones, digital still cameras and video cameras, handheld music and media players, portable video game devices and controllers, mobile internet devices (MIDs), personal navigation devices (PNDs), and other similar devices speaks the popularity and desire for these types of devices. Increasingly, such devices are equipped with one or more sensors or other systems for determining the position or motion of the portable device. Exemplary applications for such capabilities are to provide the user with navigational assistance and to enable location awareness so that the device may provide data relevant to the geographical position of the user or otherwise customize operation of the device.

Common techniques for achieving these goals include reference-based systems that utilize external sources of information to make absolute determinations. Examples include satellite-based navigation, such as a Global Navigation Satellite System (GNSS), and signal trilateration using wireless local area networks (WLANs) or cellular telecommunication systems. Other navigational techniques include self-contained strategies, such as dead reckoning determinations based upon the integration of specific forces and angular rates measured by inertial sensors (e.g. accelerometer, gyroscopes) integrated into the device.

As will be appreciated, despite the utility of such techniques, usage conditions may result in less than optimal performance. Satellite navigation relies on a clear line of sight which may not always be available while wireless signal trilateration does not always achieve a desired degree of precision and may require infrastructure that may not be present. Likewise, self-contained solutions may also be deficient at times. For example, inertial navigation determinations may be complicated when the portable device is employed in varying orientations. Further, the inertial sensors typically used in portable devices are subject to errors that may cause a dead reckoning navigational solution to degrade relative rapidly.

Given that existing positional and navigational techniques may suffer from these and other drawbacks, it would be desirable to provide an additional source of information that may be used in determine a positional and/or navigational solution. For example, it would be desirable to provide an independent positional and/or navigational solution when other techniques are unavailable or are compromised. It would also be desirable to augment an existing technique to improve performance, such as by determining a constraint that may be applied to the existing technique. Still further, it would be desirable to use an optical sensor, such as a camera that may commonly be provided with such portable devices. Accordingly, this disclosure satisfies these and other goals as described in the following materials.

SUMMARY

As will be described in detail below, this disclosure includes methods for navigating with a portable device. In one aspect, a suitable method includes processing a sequence of samples from an optical sensor of the portable device, determining usage of the portable device and estimating a speed and/or velocity for the portable device based at least in part on the processed samples and the determined usage.

This disclosure also includes a portable device which may have an optical sensor and an optical navigation module. The optical navigation module may process a sequence of samples from the optical sensor of the portable device, determine usage of the portable device and estimate a speed and/or velocity for the portable device based at least in part on the processed samples and the determined usage.

DETAILED DESCRIPTION

Figure 1:
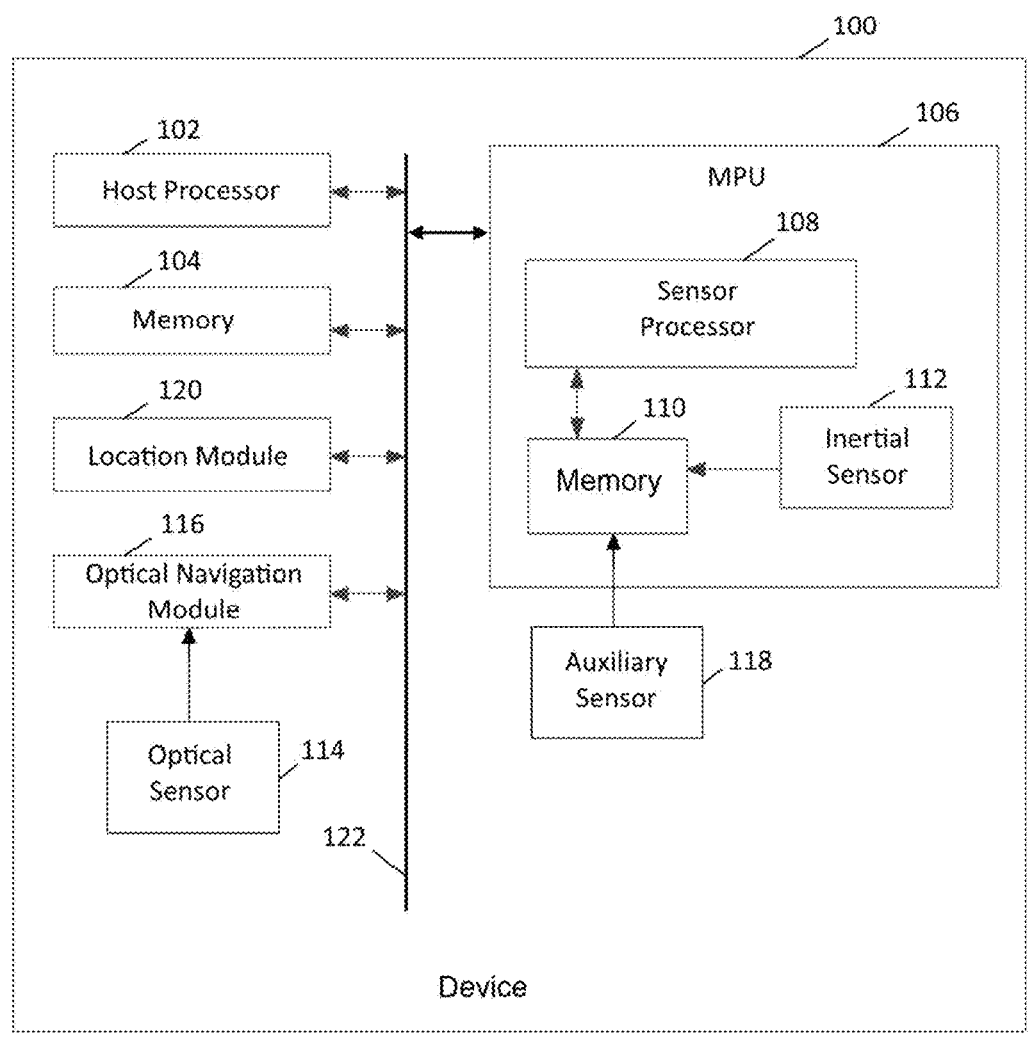
FIG. 1 is schematic diagram of a portable device for navigation according to an embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or more microprocessors in conjunction with an MPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

A portable device may have one or more sources of navigational or positional information. As noted above, a portable device may utilize external resources to develop a reference based solution such as GNSS or WLAN/cellular trilateration Such a portable device may also feature sensors, including accelerometers and gyroscopes, used to provide inertial navigation. In some embodiments, inertial sensor data may be fused with data from other sensors such as magnetometers or barometers to improve position or orientation determinations. According to this disclosure, one or more optical sensors may be used to perform a navigational or positional determination in that the optically-derived determination may be used to supplement these other navigational or positional determinations or may be used independently when the other determinations are not available. As will be appreciated, a portable device conventionally may have an optical sensor in the form of a camera which provides a valuable source of information regarding the environment surrounding the device. In some embodiments, the optical sensor may be based on a complimentary metal oxide semiconductor (CMOS) technology that is not subject to the time-varying drift associated with the types of inertial sensors typically employed in personal electronics, such as micro electro mechanical system (MEMS)-based inertial sensors.

Correspondingly, at least one optical sensor of a portable device may be used to capture a plurality of samples, such as a sequence of images. The samples may be processed to determine a constraint regarding motion of the portable device, such as by extracting one or more navigation parameters from the samples. As desired, the constraint may be used to provide a navigation solution independent of other techniques or may be used to supplement at least one other source of navigation information. In one aspect, determining the constraint may include determining a context for usage of the portable device. For example, the context may be static or in motion. Once motion has been determined, meaningful motion may be distinguished from non-meaningful, or fidgeting, motion. Further, meaningful motion may be classified as constant height or as a relative elevation change, such as moving between floors of a building. Still further, determining the context may include distinguishing between the portable device being held in a texting mode, "in hand," and being held against the user's ear during a telephone call, "on ear." In one aspect, determining the constraint may include estimating an orientation of the portable device, such as a device angle with respect to a direction of motion. In one aspect, determining the constraint may include determining an absolute and/or relative elevation of the portable device. In one aspect, determining the constraint may include determining a direction of motion of the portable device. In one aspect, determining the constraint may include determining a speed or velocity of the portable device from the samples.

As one example, many indoor scenarios would benefit from accurate height estimates, including locations of offices in towers, locating a specific shop or parking location in multi-level shopping malls and parking lots, and the like. Navigating a multi floor structure may involve common contexts such as standing still but manipulating the portable device, "fidgeting," walking on a single floor, changing floor (such as walking on stairs, and standing still or walking on an escalator). According to the techniques of this disclosure, an optical sensor of the portable device may be used to detect these contexts and obtain elevation information as a result of this motion in order to provide or supplement a navigation solution.

These and other aspects of this disclosure may be appreciated in the context of FIG. 1, which depicts features of a suitable portable device 100 with high level schematic blocks. As will be appreciated, device 100 may be implemented as a device or apparatus, such as a handheld device that can be moved in space by a user and its motion, location and/or orientation in space therefore sensed. For example, such a handheld device may be a mobile phone (e.g., cellular phone, a phone running on a local network, or any other telephone handset), personal digital assistant (PDA), video game player, video game controller, navigation device, mobile internet device (MID), personal navigation device (PND), digital still camera, digital video camera, binoculars, telephoto lens, portable music, video, or media player, remote control, or other handheld device, or a combination of one or more of these devices.

As shown, device 100 includes a host processor 102, which may be one or more microprocessors, central processing units (CPUs), or other processors to run software programs, which may be stored in memory 104, associated with the functions of device 100. Multiple layers of software can be provided in memory 104, which may be any combination of computer readable medium such as electronic memory or other storage medium such as hard disk, optical disk, etc., for use with the host processor 102. For example, an operating system layer can be provided for device 100 to control and manage system resources in real time, enable functions of application software and other layers, and interface application programs with other software and functions of device 100. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single device 100, and in some of those embodiments, multiple applications can run simultaneously.

Device 100 may also include integrated motion processing unit (MPU™) 106 featuring sensor processor 108, memory 110 and inertial sensor 112. Memory 110 may store algorithms, routines or other instructions for processing data output by pressure sensor 112 and/or other sensors as described below using logic or controllers of sensor processor 108, as well as storing raw data and/or motion data output by inertial sensor 112 or other sensors. Inertial sensor 112 may be one or more sensors for measuring motion of device 100 in space. Depending on the configuration, MPU 106 measures one or more axes of rotation and/or one or more axes of acceleration of the device. In one embodiment, inertial sensor 112 may include rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, such that a sensor fusion operation performed by sensor processor 108, or other processing resources of device 100, combines data from inertial sensor 112 to provide a six axis determination of motion. As desired, inertial sensor 112 may be implemented using MEMS to be integrated with MPU 106 in a single package. Exemplary details regarding suitable configurations of host processor 102 and MPU 106 may be found in co-pending, commonly owned U.S. patent application Ser. No. 11/774,488, filed Jul. 6, 1007, and Ser. No. 12/106,921, filed Apr. 11, 1008, which are hereby incorporated by reference in their entirety. Suitable implementations for MPU 106 in device 100 are available from InvenSense, Inc. of Sunnyvale, Calif.

Device 100 may also include at least one optical sensor 114, such as a CMOS camera or other similar component. Optical sensor 114 outputs recorded images as samples to optical navigation module 116. As will be described in further detail below, optical processor 116 may perform one or more algorithms or operations on the samples to determine a navigational constraint according to the techniques of this disclosure. One or more additional sensors, such as auxiliary sensor 118, may also be provided. Auxiliary sensor 118 may be configured to measure one or more aspects about the environment surrounding device 100. For example, a barometer and/or a magnetometer may be used to refine position determinations made using inertial sensor 112. In one embodiment, auxiliary sensor 118 may include a magnetometer measuring along three orthogonal axes and output data to be fused with the gyroscope and accelerometer inertial sensor data to provide a nine axis determination of motion. In another embodiment, auxiliary sensor 118 may also include a barometer to provide an altitude determination that may be fused with the other sensor data to provide a ten axis determination of motion. Although described in the context of one or more sensors being MEMS based, the techniques of this disclosure may be applied to any sensor design or implementation.

As noted above, device 100 also features location awareness capabilities, such as may be provided by location module 120. In general, location awareness refers to the use of any suitable technique to determine the geospatial position of device 100. One of skill in the art will appreciate that any number of technologies may be implemented as desired. Without limitation, examples of suitable location awareness methods include global navigation satellite systems (GNSS), such as global positioning system (GPS), global navigation satellite system (GLONASS), Galileo and Beidou, as well as WiFi™ positioning, cellular tower positioning, Bluetooth™ positioning beacons, dead reckoning or other similar methods. Location module 120 may also be configured to use information from a wireless communication protocol to provide a position determination using signal trilateration. Any suitable protocol, including cellular-based and wireless local area network (WLAN) technologies such as Universal Terrestrial Radio Access (UTRA), Code Division Multiple Access (CDMA) networks, Global System for Mobile Communications (GSM), the Institute of Electrical and Electronics Engineers (IEEE) 802.16 (WiMAX), Long Term Evolution (LTE), IEEE 802.11 (WiFi™) and others may be employed.

In the embodiment shown, host processor 102, memory 104, MPU 106 and other components of device 100 may be coupled through bus 122, which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 100, such as by using a dedicated bus between host processor 102 and memory 104. As noted above, multiple layers of software may be employed as desired and stored in any combination of memory 104, memory 110, or other suitable location. For example, a motion algorithm layer can provide motion algorithms that provide lower-level processing for raw sensor data provided from the motion sensors and other sensors. A sensor device driver layer may provide a software interface to the hardware sensors of device 100. Further, a suitable application program interface (API) may be provided to facilitate communication between host processor 102, MPU 106 and optical navigation module 116, for example, to transmit desired sensor processing tasks.

Other embodiments may feature any desired division of processing between host processor 102, MPU 106 and optical navigation module 116, as appropriate for the applications and/or hardware being employed. Optical navigation module 116 may be implemented as any suitable combination of hardware and software to perform the desired operations and algorithms on samples from optical sensor 114 to determine a navigational constraint. Aspects implemented in software may include but is not limited to, application software, firmware, resident software, microcode, etc., and may take the form of a computer program product accessible from a computer-usable or computer-readable medium providing program code for use by or in connection with a computer or any instruction execution system, such as host processor 102, sensor processor 108, a dedicated processor or any other processing resources of device 100.

As noted above, the techniques of this disclosure include capturing a plurality of samples, such as by using optical sensor 114 of device 100. Optical navigation module 116 may process the samples to determine a constraint regarding motion of portable device 100 to be used in a navigational solution. The following embodiments describe suitable operations that may be performed by optical navigation module 116. These are intended to illustrate examples only and should not be construed as limiting. As will be appreciated, not all operations may be performed depending on the embodiment. Further, other equivalent operations may be substituted as known to those of skill in the art.

Figure 2:
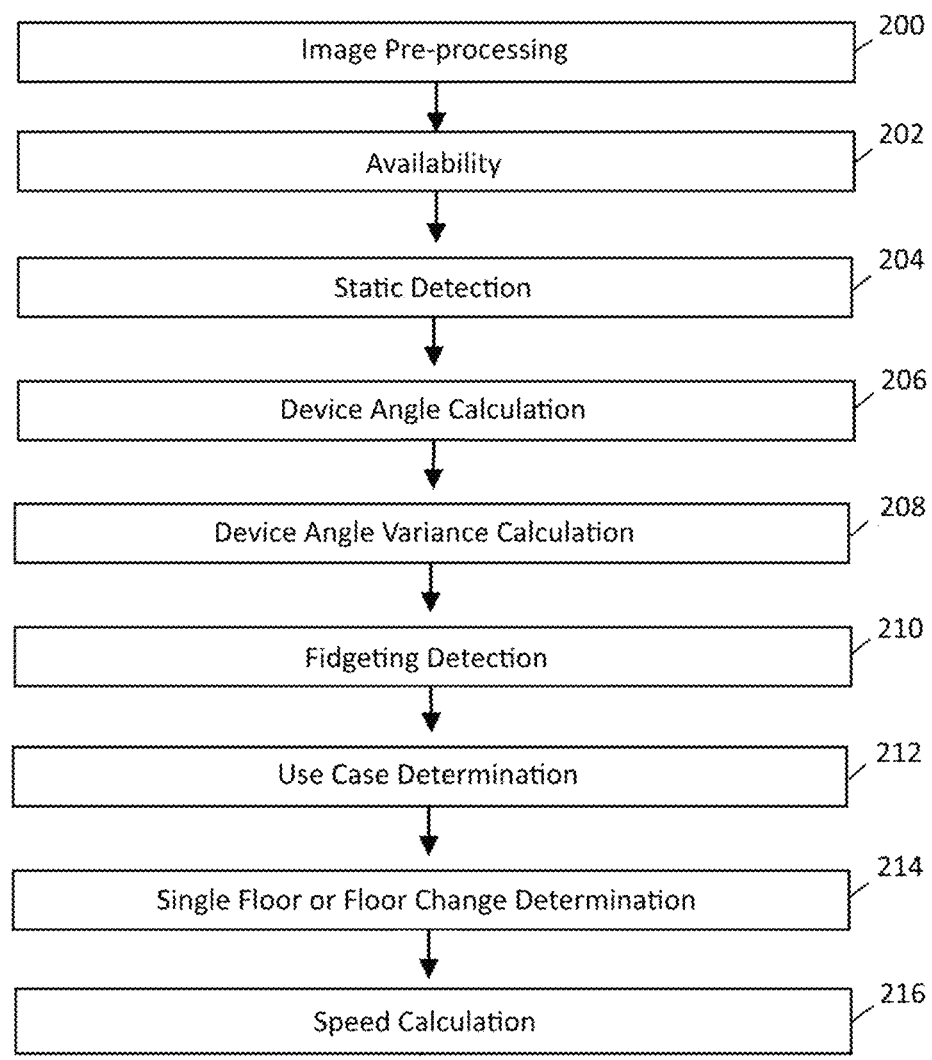
FIG. 2 is a flowchart showing a routine for providing a navigation solution for a portable device according to an embodiment.

In one embodiment, optical navigation module 116 may be configured to perform the operations represented by the flowchart shown in FIG. 2 to extract relevant information embedded in the images. The images captured may be processed to extract unique features related to a context of device 100. Beginning with 200, the samples from optical sensor 114 may be pre-processed to facilitate additional operations that may be performed. Next, the availability of sufficient detail in the samples may be assessed in 202. Subsequently, in 204, the samples may be analyzed to determine whether the recorded images are static which may be used to detect whether device 100 is in a motion-less state. If not in a motion-less state, optical navigation module 116 may process the samples to calculate the angle of device 100 with respect to a direction of motion in 206. Then, in 208, variance in the calculated device angle is assessed to determine a context for the use of device 100. Based on the characteristics determined in 208, optical navigation module 116 may determine whether the motion is non-meaningful and may be categorized as fidgeting in 210. Otherwise, in 212 optical navigation module 116 determines the motion is meaningful and refines the context currently ascribed to device 100. In 214, optical navigation module 116 may detect whether a relative change in elevation is occurring. Then, in 216, a current speed of device 100 may be determined.

As noted, this disclosure includes methods for navigating with a portable device. In one aspect, a suitable method includes processing a sequence of samples from an optical sensor of the portable device, determining a navigational constraint for the portable device based at least in part on the processed samples and providing a navigation solution for the portable device based at least in part on the determined constraint. Determining a navigational constraint may include determining a context for the portable device. Determining a navigational constraint may include estimating a speed and/or velocity of the portable device.

In one aspect, processing the sequence of samples from the optical sensor may include performing an optical flow analysis.

In one aspect, estimating speed may include determining a context for the portable device. Processing the sequence of samples from the optical sensor may include performing an optical flow analysis. A device angle with respect to a direction of motion may be estimated. The context of the portable device may be determined by assessing variance in a plurality of estimated device angles. The context of the portable device may be determined by calculating an optical flow ratio. The context of the portable device may be determined by comparing similarity between samples. The context of the portable device may be determined by identifying a feature in the samples.

In one aspect, the context may be determined to correspond to being static. Speed for the portable device may be estimated as zero based at least in part on the determination of being static.

In one aspect, the context may be determined to correspond to fidgeting motion. Speed for a user may be estimated as zero based at least in part on the determination of fidgeting motion, corresponding to non-walking motion.

In one aspect, performing the optical flow analysis may include aggregating estimations of pixel translations between the samples.

In one aspect, usage of the portable device may be determined to correspond to dangling motion based at least in part on the aggregated estimations of pixel translations. Estimating the speed of the portable device may be based at least in part on the aggregated estimations of pixel translations during complementary half-cycles of arm motion. Estimating the speed of the portable device may be based at least in part on a value for user arm length selected from at least one of a value estimated from user dynamics, a predetermined average value and a user input value. The user dynamics may be derived from a source of absolute navigation information.

In one aspect, an angle of the portable device may be determined in relation to a direction of movement based at least in part on the determination that usage of the portable device corresponds to dangling motion. Determining the angle of the portable device in relation to the direction of movement may be based at least in part on the aggregated estimations of pixel translations during complementary half-cycles of arm motion. Determining a velocity of the portable device based at least in part on the estimated speed and the determined angle.

In one aspect, usage of the portable device may be determined to not correspond to dangling motion. An angle of the portable device in relation to a direction of movement may be determined based at least in part on the aggregated estimations of pixel translations, wherein determining usage of the portable device may be based at least in part on an orientation determination using an inertial sensor and the determined angle. Estimating the speed of the portable device may be based at least in part on the aggregated estimations of pixel translations and the determined angle. Estimating the speed of the portable device may be based at least in part on a value for user height selected from at least one of a value estimated from user dynamics, a predetermined average value and a user input value. The user dynamics may be derived from a source of absolute navigation information. Estimating the speed of the portable device may be based at least in part on an inclination angle of the portable device.

In one aspect, usage of the portable device may be determined to correspond to texting.

In one aspect, usage of the portable device may be determined to correspond to calling. The method may include detecting that no turn has occurred. A ground feature may be detected in the sequence of samples for the calling use case.

In one aspect, a velocity of the portable device may be based at least in part on the estimated speed and the determined angle.

This disclosure also includes a portable device having an optical sensor and an optical navigation module, wherein the optical navigation module is configured to process a sequence of samples from the optical sensor of the portable device, determine usage of the portable device and estimate a speed for the portable device based at least in part on the processed samples and the determined usage.

In one aspect, the optical navigation module may determine that usage of the portable device corresponds to dangling motion or does not correspond to dangling motion based at least in part on aggregated estimations of pixel translations between samples.

In one aspect, the portable device may have an inertial sensor and the optical navigation module may determine an angle of the portable device in relation to a direction of movement based at least in part on aggregated estimations of pixel translations between samples, such that determining usage of the portable device may be based at least in part on an orientation determination using an inertial sensor and the determined angle.

In one aspect, the optical module may estimate the speed of the portable device based at least in part on a value estimated from user dynamics. For example, the estimated value may correspond to user arm length and/or user height. The portable device may have a source of absolute navigation information including any one or combination of the following: (i) a global navigation satellite system (GNSS); (ii) cell-based positioning; (iii) WiFi-based positioning; or (iv) other wireless-based positioning. The user dynamics may be derived from the source of absolute navigation information.

In one aspect, the optical navigation module may be further configured to determine an angle of the portable device in relation to a direction of movement based at least in part on aggregated estimations of pixel translations between samples and to estimate the speed of the portable device may be based at least in part on the aggregated estimations of pixel translations and the determined angle.

In one aspect, the portable device may have an inertial sensor and the optical navigation module may provide a navigation solution based at least in part on data from the inertial sensor and the estimated speed of the portable device.

Non-limiting examples of suitable operations that may be performed for each of these stages are described in the material below.

EXAMPLES

With respect to 200, pre-processing samples from optical sensor 214 may include reducing the size of the samples to facilitate processing. To increase processing speed, the pixel resolution of the captured samples may be reduced by a suitable factor. For example, an approximately 90% reduction in image size may still permit accurate determination of the navigation constraint while significantly decreasing the processing load. Other image size reductions may be employed, such as approximately 50% or more.

In one embodiment, optical sensor 214 may output images captured in 24-bit (3-channel RGB color) which may then be converted to 8-bit (single-channel grayscale), such as by the following process. Two color sequential samples may be denoted $I_k(x,y)$ and $I_{k-1}(x,y)$ of pixel size $N_x$ by $N_y$ within a given sequence where x and y represent the spatial coordinates and k represents the temporal coordinate of the frame. The value at every (x,y) location in $I_k$ and $I_{k-1}$ is a triplet whose individual elements indicate the 8-bit integer (0-255) intensity value of each of the red, green, and blue (RGB) color channels in the form (r, g, b). The grayscale conversion may be simplified by representing each image by three $N_x \times N_y \times 1$ arrays. Correspondingly, each array holds the 8-bit intensity value for one the three RGB color channels. As a result, the three-channel color image $I_k(x,y)$ may be decomposed into single-channel (i.e. single-color) arrays $r_k(x,y)$, $g_k(x,y)$ and $b_k(x,y)$.

The single-channel grayscale images obtained from the split-channel color images r(x,y), g(x,y), and b(x,y) may be denoted $G_k(x,y)$ and $G_{k-1}(x,y)$ as per the Rec. 601 formula used in the NTSC and PAL television standards according to Equation (1):

$$G_k(x,y) = 0.299 r_k(x,y) + 0.587 g_k(x,y) + 0.114 b_k(x,y) \tag{1}$$

Optionally, the grayscale images $G_k(x,y)$ and $G_{k-1}(x,y)$ may be subjected to further preprocessing to remove noise, enhance contrast, and the like. Examples of suitable operations that may be performed include histogram equalization and Gaussian smoothing as known to those of skill in the art.

With respect to 202, availability may be considered a measure of the homogeneity of an image (i.e. a measure of how feature-rich an image is) and is based on the derivative, or gradient, of the image. It is desirable to ensure that the captured images have sufficient features to be used for subsequent operations performed by optical navigation module 216. The first spatial derivative of an image may be obtained by convolving the image with a filter such as the Sobel filter and aggregating the result across the image. For example, a Sobel filter operation employs two 3×3 kernels which are convolved with the original image to calculate approximations of the horizontal and vertical derivatives. By denoting f as the source image, the horizontal and vertical approximations $G_x$ and $G_y$ are given as Equations (2) and (3), respectively, wherein '*' denotes a 2-dimensional convolution operation corresponding to image smoothing:

$$G_x = \begin{bmatrix} -1 & 0 & 1 \\ -2 & 0 & 2 \\ -1 & 0 & 1 \end{bmatrix} * f \tag{2}$$

$$G_y = \begin{bmatrix} -1 & 2 & 1 \\ 0 & 0 & 0 \\ -1 & 2 & 1 \end{bmatrix} * f \quad (3)$$

The resulting gradient approximations in each direction can be combined to give the overall gradient magnitude G according to Equation (4):

$$G = \sqrt{G_x^2 + G_y^2} \quad (4)$$

In turn, the gradient magnitudes may be aggregated as D across the entire image, as indicated by Equation (5):

$$D = \sum_{j=0}^{N_y-1} \sum_{i=0}^{N_x-1} G[i, j] \quad (5)$$

Normalizing the aggregated derivative value D by dividing by the maximum intensity change between pixels (i.e. 0-255) in the entire image yields $D_{norm}$ according to Equation (6):

$$D_{norm} = \frac{D}{(N_x * N_y) * 255} \quad (6)$$

As will be appreciated, a small normalized aggregated derivative value, $D_{norm}$, implies high homogeneity and a lack of features that can be used for the subsequent processing operations while a high derivative value implies greater variation with the image. For example, large intensity fluctuations are indicative of objects being within the field of view. In one aspect, the presence of multiple objects allows for a more reliable determination of navigational constraints.

With respect to 204, detection of whether portable device 100 is in a static, motionless state may be determined by assessing the degree of similarity between samples. In one embodiment, optical navigation module 116 may be configured to detect a static state of device 100 using the Mean Structural Similarity Index (MSSIM). The MSSIM is a singular value that quantifies the degree to which two images match in luminance, contrast, and structure. For two input signals x and y, the SSIM within a window m of size N×N is given by Equation (7), wherein $\mu_x$ and $\mu_y$ are the means of $x_m$ and $y_m$, $\sigma_x^2$ and $\sigma_y^2$ are the variance of $x_m$ and $y_m$, $\sigma_{xy}$ is the covariance between $x_m$ and $y_m$, and $C_1$ and $C_2$ are stabilizing coefficients:

$$SSIM(x_m, y_m) = \frac{(2\mu_x\mu_y + C_1)(2\sigma_{xy} + C_2)}{(\mu_x^2 + \mu_y^2 + C_1)(\sigma_x^2 + \sigma_y^2 + C_2)} \quad (7)$$

By taking the mean value across all M windows used to construct the structural similarity array, the MSSIM may be represented by Equation (8):

$$MSSIM(x, y) = \frac{\sum_{m=1}^{M} SSIM(x_m, y_m)}{M} \quad (8)$$

An MSSIM value of zero may be taken as an indication that the two images are completely unrelated, while a value of one indicates that the images are identical. Because a static feature-rich scene and a moving feature-less scene would both result in a high MSSIM, characteristics in addition to the MSSIM value may be employed for static detection. For example, when the MSSIM value of a pair of images exceeds a threshold, the homogeneity of the images may also be assessed. In one aspect, a high homogeneity (i.e. small derivative value) of the scene being captured may indicate largely uniform images and may reduce the confidence in any navigational constraint subsequently determined from those images. Conversely, high derivative values may indicate the scene is feature-rich and the confidence in a corresponding navigational constraint determined from the images may be increased.

With respect to 206, optical navigation module 116 may determine an angle of device 100 in relation to direction of movement, which may also be termed device angle or misalignment angle. In one embodiment, device angle may be determined by calculating optical flow of the samples from optical sensor 114. For example, the grey-scale images $G_k(x,y)$ and $G_{k-1}(x,y)$ derived according to Equation (1), may be supplied to an optical flow calculation routine along with other algorithm-specific parameters including decomposition scale, number of levels, iterations, and the like. A flow map F may result from the optical flow calculation based on the brightness constancy constraint by assuming that changes in pixel intensities are only due to small translational motions in the time interval between images. In one aspect, brightness constancy is the assumption that a pixel at location (x, y, t) with intensity I(x, y, t) will have moved by Δx and Δy in the time interval between images Δt as given by Equation (9):

$$I(x,y,t) = I(x+\Delta x, y+\Delta y, t+\Delta t) \quad (9)$$

When the translational movement is relatively small, the brightness constancy equation may be expanded using a Taylor series, as given by the first-order approximation represented by Equation (10):

$$I(x+\Delta x, y+\Delta y, t+\Delta t) = I(x, y, t) + \frac{\partial I}{\partial x}\Delta x + \frac{\partial I}{\partial y}\Delta y + \frac{\partial I}{\partial t}\Delta t \quad (10)$$

Correspondingly, Equation (11) follows from Equation (10):

$$\frac{\partial I}{\partial x}\Delta x + \frac{\partial I}{\partial y}\Delta y + \frac{\partial I}{\partial t}\Delta t = 0 \quad (11)$$

Further, dividing each term by the time interval Δt leads to Equation (12):

$$\frac{\partial I}{\partial x}\frac{\Delta x}{\Delta t} + \frac{\partial I}{\partial y}\frac{\Delta y}{\Delta t} + \frac{\partial I}{\partial t}\frac{\Delta t}{\Delta t} = 0 \quad (12)$$

Equation (12) then results in Equation (13), where $u_x$ and $u_y$ are the x and y components of the velocity and referred to as the optical flow, $$\frac{\partial I}{\partial x} \text{ and } \frac{\partial I}{\partial y}$$

are the spatial derivatives of the image intensities and $$\frac{\partial I}{\partial t}$$

is the temporal derivative:

$$\frac{\partial I}{\partial x}u_x + \frac{\partial I}{\partial y}u_y + \frac{\partial I}{\partial t} = 0 \quad (13)$$

Since this is an equation in two unknowns, it may not be solved readily without another set of equations, a condition known as the "aperture problem." In one embodiment, a tensor-based Farnebeck method using polynomial expansion may be employed to approximate the neighborhood of each pixel in each frame using second-degree polynomials and in turn estimate displacement from a knowledge of how these polynomials change under translation. For example, polynomial expansion is to approximate the area surrounding each pixel with a quadratic polynomial $f_1$ as denoted in Equation (14), where A is a symmetric matrix, b a vector and c a scalar:

$$f_1(x) = x^T A_1 x + b_1^T x + c_1 \quad (14)$$

The three coefficients may be estimated from a weighted least squares fit to the intensity values in a defined area. The weighting has two components called certainty and applicability that determine which regions of the image are involved in the calculation and the size of the structures that will be represented by the expansion coefficients, respectively.

Since the premise of polynomial expansion is to approximate areas surrounding the pixels by a polynomial, letting $f_1$ undergo an ideal global displacement d results in a calculation for $f_2$ as indicated by Equation (15):

$$\begin{aligned} f_2(x) &= f_1(x-d) \\ &= (x-d)^T A_1(x-d) + b_1^T(x-d) + c_1 \\ &= x^T A_1 x + (b_1 - 2A_1 d)^T x + d^T A_1 d - b_1^T d + c_1 \\ &= x^T A_2 x + b_2^T x + c_2 \end{aligned} \quad (15)$$

By equating the coefficients of $f_1$ and $f_2$, such that $A_2 = A_1$, $b_2 = b_1 - 2A_1 d$ and $c_2 = d^T A_1 d - b_1^T d + c_1$, Equation (15) may be rearranged for $b_2$ and solved for the translation d as indicated by Equation (16):

$$d = -\frac{1}{2}A_1^{-1}(b_2 - b_1) \quad (16)$$

Accordingly, the output of the optical flow routine is the flow map $F_k(x,y)$ where each element is a tuple indicating an estimate of the translational motion (dx,dy) undergone by the intensity value at location (x,y) between images $G_k$ and $G_{k-1}$. The dual-channel flow map F may be split into two single-channel matrices $dx_k(x,y)$ and $dy_k(x,y)$. All x- and y-components of the flow map elements may then be summed to provide the aggregate translation, $dx_{agg,k}$ and $dy_{agg,k}$, between images $G_k$ and $G_{k-1}$, respectively given by Equations (17) and (18):

$$dx_{agg,k} = \sum_{j=0}^{N_y-1} \sum_{i=0}^{N_x-1} dx_{agg,k}[i,j] \quad (17)$$

$$dy_{agg,k} = \sum_{j=0}^{N_y-1} \sum_{i=0}^{N_x-1} dy_{agg,k}[i,j] \quad (18)$$

In one aspect, determination of device angle by optical navigation module 116 may be used to classify a current usage of device 100, also termed "use case." As such, a context determined for device 100 may include the current usage. For example, device 100 may be a communications apparatus such as a cellular telephone, allowing the user to conduct voice calls or to text. In one embodiment, information from inertial sensor 112 regarding the pitch and/or roll of device 100 may be employed to distinguish between a primarily horizontal orientation associated with texting use, a primarily vertical orientation in front of the user and a sideways orientation against the user's ear for phoning use, "on ear." For example, pitch, roll, and device angle may be used to distinguish texting mode from calling mode. In one aspect, if the pitch is near 90° and misalignment (device angle) is around 90 or −90°, device 100 may be construed to be speaker up with the camera to the side. In another aspect, if the roll is near 90 or −90° and the device angle is approximately 0 or 180°, the device may be construed to be held with the speaker backwards or forwards (respectively) and the camera is to the side. In both cases device 100 may be taken as being in on ear mode, while if neither case is satisfied, the device may be taken as being in texting mode. In other embodiments, similar determinations may be performed to classify other common uses of the portable device. In still other embodiments, host processor 102 may provide an indication of applications currently running on device 100 to provide an indication of the current use. Consequently, the aggregate x and y flow velocities may be used to finalize the estimate for device angle depending on the determined usage.

In one embodiment, the current use of device 100 may be determined to be associated with a primarily horizontal orientation. Under such conditions, the device angle $\theta_k$ may be calculated according to Equation (19):

$$\theta_k = \text{atan } 2(dy_{agg,k}, dx_{agg,k}) \quad (19)$$

Figure 3:
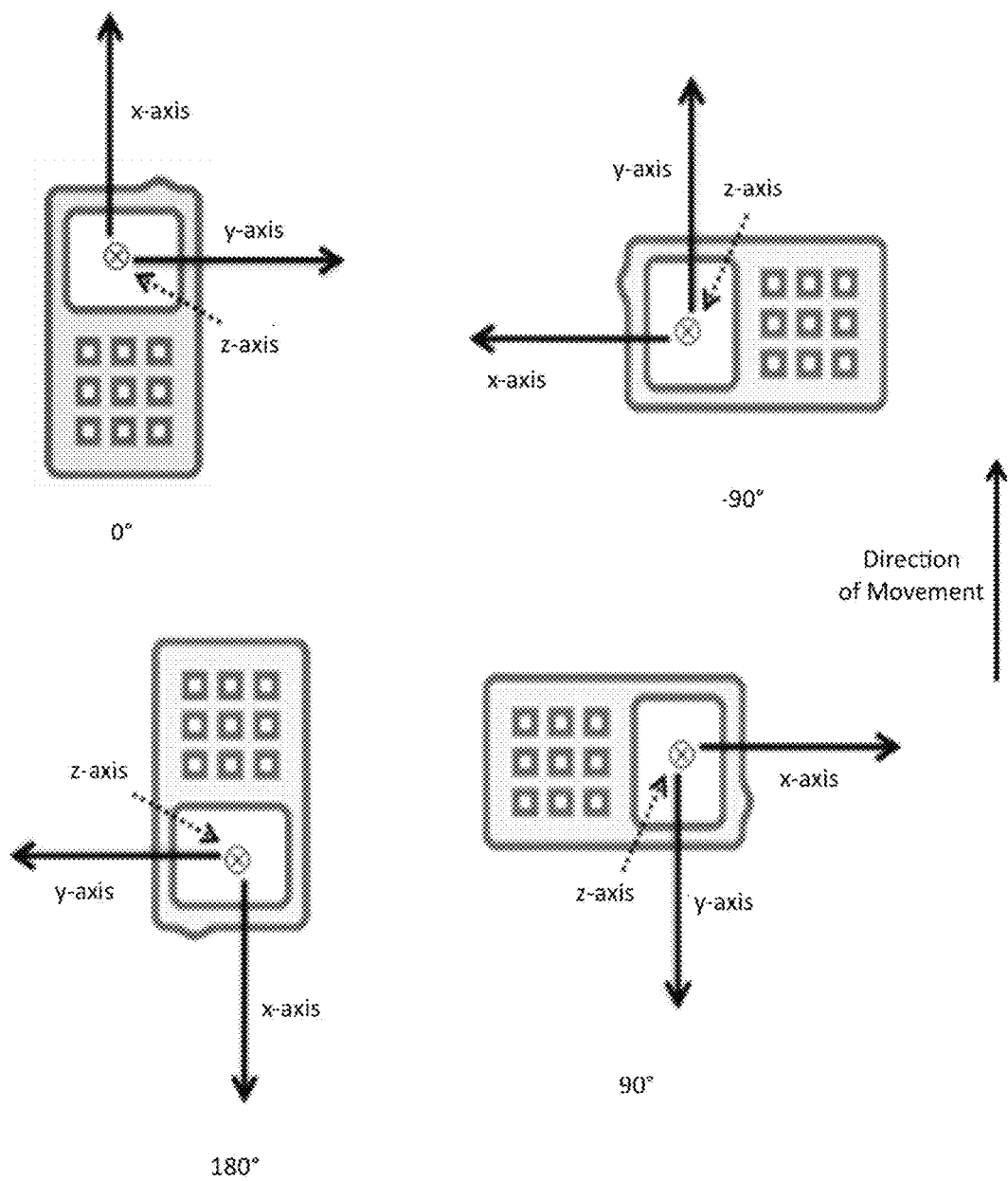
FIG. 3 is a schematic representation of common device angles that may be determined by optical flow calculations according to an embodiment.

As shown, in FIG. 3, typical device angles of 0, 90, 180, and −90° with respect to the direction of motion are common when device 100 is employed in a texting mode or other primarily horizontal orientation. In each case, the z-axis runs perpendicularly into the page.

Figure 4:
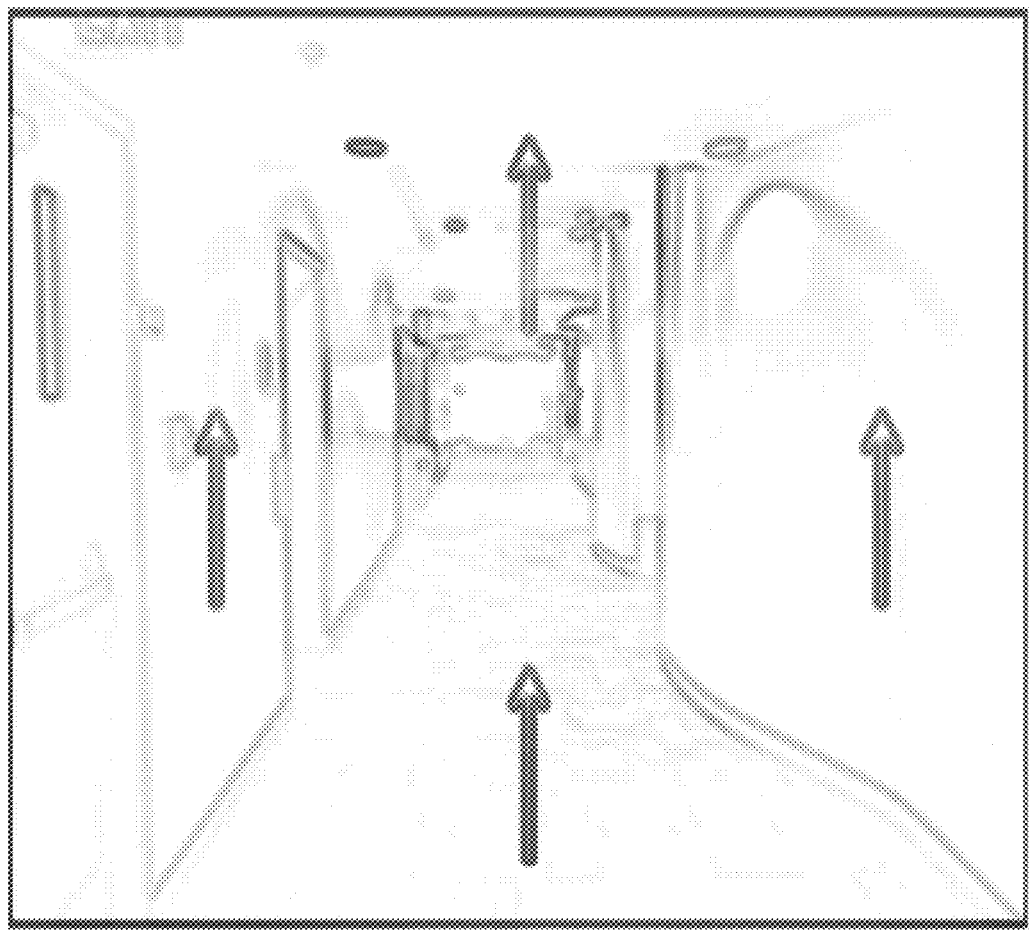
FIG. 4 is a representation of a divergent optical flow obtained when the device is in the vertical use case according to an embodiment.
Figure 5:
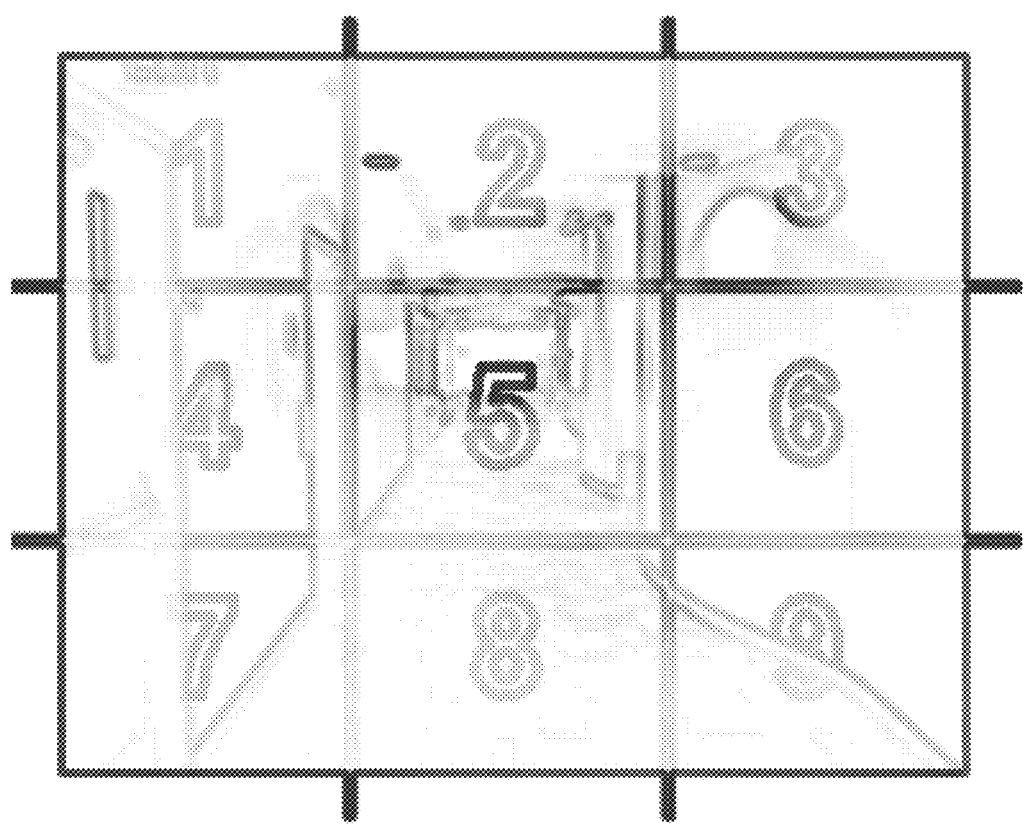
FIG. 5 is a representation of an exemplary optical sensor image when the device is held in the vertical use case at an angle of 0° according to an embodiment.
Figure 6:
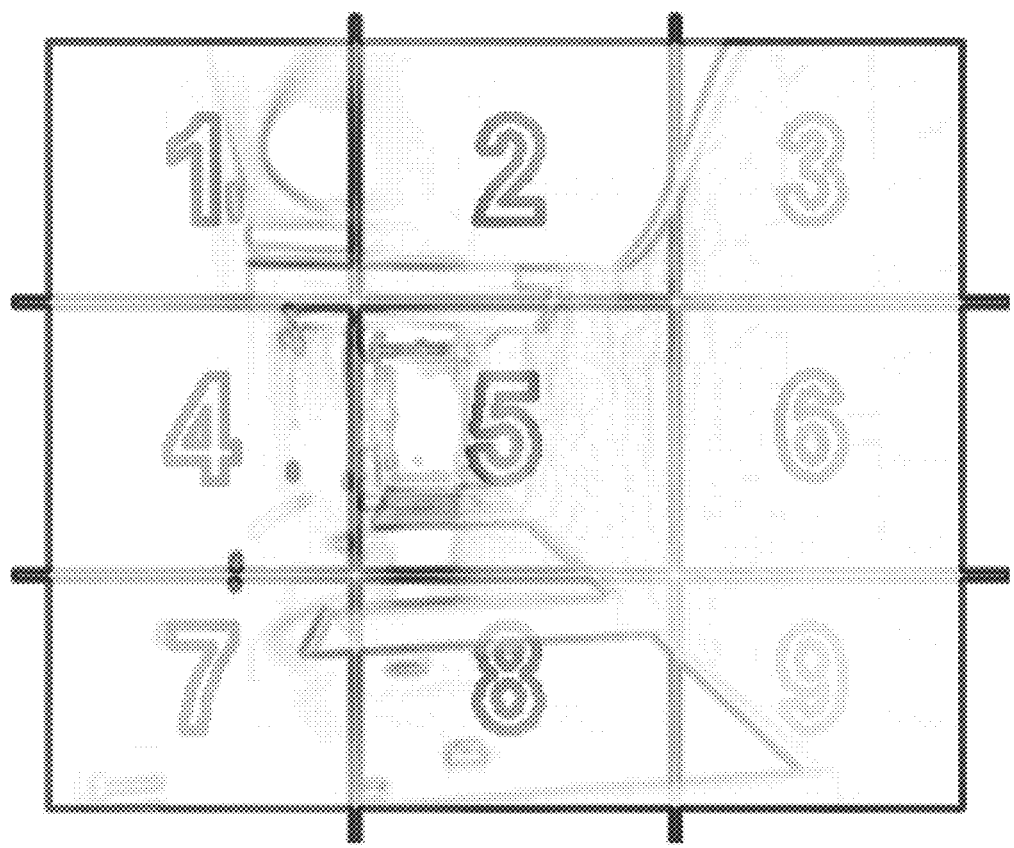
FIG. 6 is a representation of an exemplary optical sensor image when the device is held in the vertical use case at an angle of 90° according to an embodiment.

In one embodiment, the current use of device 100 may be determined to be associated with a primarily vertical orientation. For a vertical use case (e.g. walking down a hallway), using the entire image for the optical flow calculation may result in an incorrect determination of device angle. In the vertical use case, the optical flow routine returns a non-uniform flow map that diverges outwards from a central location known as the "vanishing point" of the image, as illustrated in FIG. 4. Accordingly, the translation undergone by the region of the image in which the ground or floor is located is generally most indicative of the device orientation, the area of the image representing the ground or floor may be identified and used in the optical flow calculation to obtain the correct value of the device angle. In one aspect, determining the location of the floor region may include partitioning the image into a grid of equally-sized cells, such as 3×3. Thus, the cell corresponding to the ground may be used for optical flow calculation. One example includes device 100 held at an angle of 0°, such that the ground is typically in the bottom-most middle cell, denoted cell 8 as shown in FIG. 5. Another example includes device 100 held at an angle of 90°, such that the ground corresponds to cell 6 as shown in FIG. 6. Following a determination of a vertical use, the device angle $\theta_k$ may be computed using the values of the aggregate x- and y-translation of the identified ground or floor region as indicated by Equation (20):

$$\theta_k = \text{atan } 2(dy_{agg,k}^{floor}, dx_{agg,k}^{floor}) \quad (20)$$

In one embodiment, the current use of device 100 may be determined to be on ear. Edge detection may be performed on a sample from optical sensor 114 to identify the boundary between the ground and wall planes, as well as the boundary between the wall and ceiling planes. These two lines may be examined for parallelism, the degree to which they are parallel with respect to each other. When the ground-wall and wall-ceiling edges exhibit a high degree of parallelism, the device angle may be taken as 0°. When the ground-wall and wall-ceiling edges slope towards each other, the slopes of the lines may be used to find the intersection point. The magnitude of the device angle may be derived as being inversely proportional to the distance between the intersection point and the center of the image, and may be tuned with a scale factor as desired. The location of the intersection point of the two lines behind or ahead of the image with respect to the direction of motion indicates whether the device angle is positive or negative, respectively.

With respect to 208, optical navigation module 116 may determine a context for device 100 based on parameters extracted from the samples. For example, determination of variance in the device angle over time may be used to classify motion of device 100 as meaningless fidgeting, corresponding to 210, or as meaningful, allowing for subsequent determination of context corresponding to 212. In one embodiment, the variance of device angle may be obtained using the values of the aggregated optical flow. A normalized variance of device angle, $\sigma_\theta^2$, may be derived from Equations (21) and (22):

$$R^2 = \left(\sum_{i=1}^{N} \cos\theta_i\right)^2 + \left(\sum_{i=1}^{N} \sin\theta_i\right)^2 \quad (21)$$

$$\sigma_\theta^2 = 1 - \frac{R}{N} \quad (22)$$

Figure 7:
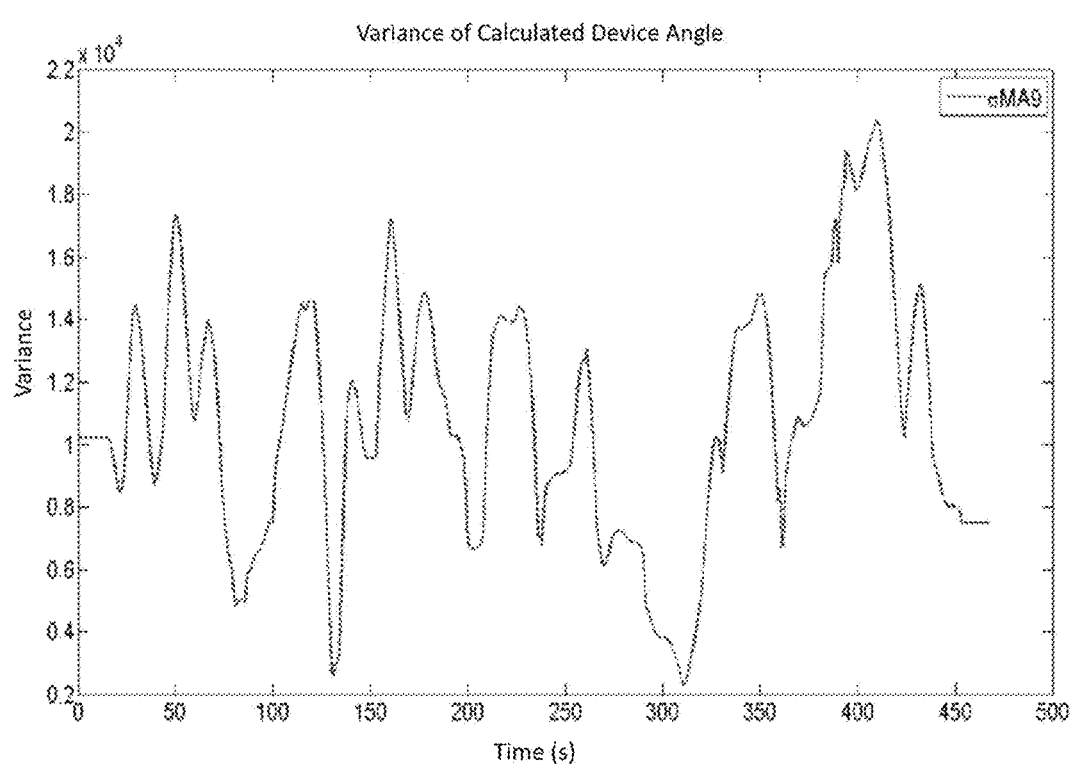
FIG. 7 is a graph showing variance in calculated device angle corresponding to a fidgeting context according to an embodiment.
Figure 8:
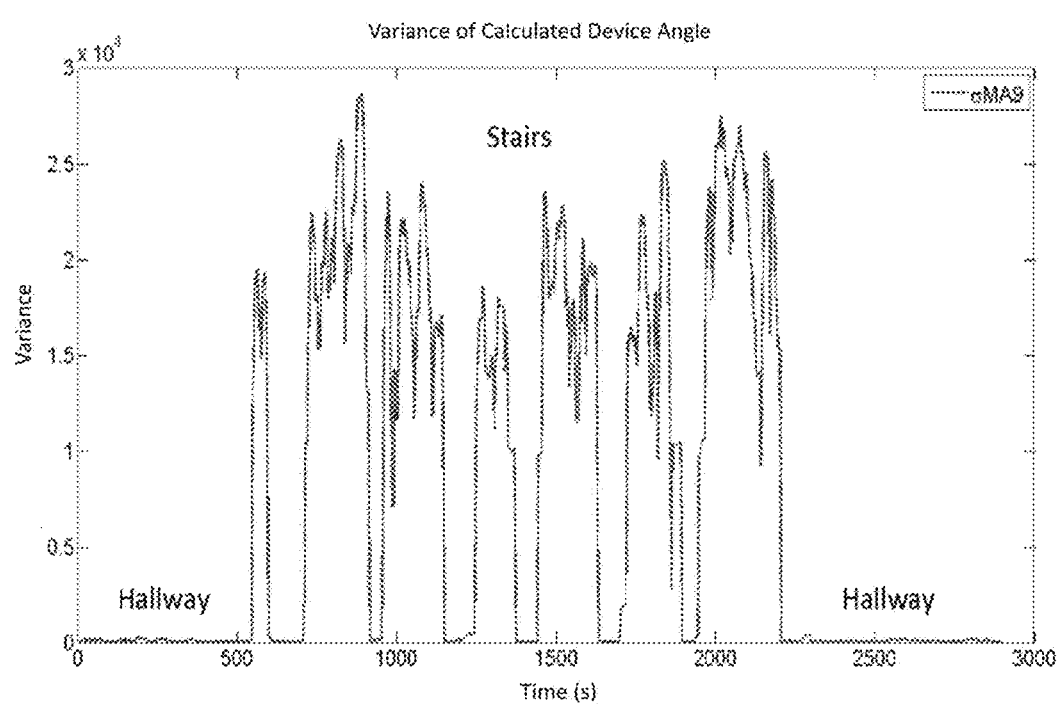
FIG. 8 is a graph showing variance in calculated device angle corresponding to a multi floor movement according to an embodiment.

By comparing the variance or square root of the variance (i.e. standard deviation) of the device angle to a threshold value, optical navigation module 116 may determine if the phone is undergoing fidgeting or meaningful motion as fidgeting is associated with relatively high device angle variance and meaningful motion is associated with relatively low device angle variance. In one example, sustained regions of high variance may result in a determination of fidgeting as depicted in FIG. 7. As another example, transitions from regions of low variance to high variance may result in a determination that the user was walking on level ground and has begun motion on stairs as shown in FIG. 8. Alternatively or in addition, the raw flow signals themselves may be computed over a specified window and assessed for variance.

In other embodiments, any suitable signal parameter may be analyzed for patterns to indicate the type of motion undergone by device 100. Such signals can exhibit random behavior, constant behavior, or periodic behavior. As a further example, if the Fourier transform of the flow values indicates a strong periodic component, the device can be assumed to be dangling at a constant frequency. To account for momentary anomalies due to uncontrollable environmental disturbances, the history of the classifications may be maintained to confirm the analysis. When there is correspondence with the stored history, the context classification may be treated with higher confidence. In one aspect, the degree to which a determined navigational constraint is weighted when supplementing other navigational solutions or the extent to which the navigational constraint is relied upon as an independent navigational solution may depend on the confidence.

One technique for determining device angle, such as for example when device 100 is categorized as being in a dangling use case, may include differencing the binary thresholded flow ($D_x$ and $D_y$) and/or the maximum and minimum peaks in either the pitch or roll signals from the device's on-board IMU to obtain the transition points between the start of forward and backward half-cycles of arm motion while in a dangling use case. When the magnitude of the cumulative x flow over the full cycle is greater than that of the cumulative y flow over the full cycle and/or if the pitch is found to have a larger periodic signal than roll and/or if the x-flow exhibits greater periodicity than the y-flow (as shown by the magnitude spectrum of the differenced binary thresholded signal), the absolute values of the x-flows in each half-cycle may be integrated. If the cumulative x-flow, $dx_{cum}$, during the positive half cycle (PHC) is greater than the cumulative x-flow in the negative half-cycle (NHC), this indicates that the device is in the direction of the motion and the device angle is taken to be 0 degrees. Otherwise, the device is oriented against the direction of motion and the device angle is taken to be 180 degrees. These conditions may be expressed as Equation (23):

$$\theta_k = \begin{cases} 0 & \text{if } dx_{cum} \text{ in } PHC > dx_{cum} \text{ in } NHC \\ 180 & \text{else} \end{cases} \quad (23)$$

If the magnitude of the cumulative x flow over the full cycle is less than that of the cumulative y flow over the full cycle and/or if the roll is found to have a larger periodic signal than pitch and/or if the y-flow exhibits greater periodicity than the x-flow (as shown by the magnitude spectrum of the differenced binary thresholded signal), the absolute values of the aggregated y-flows in each half-cycle are integrated. If the cumulative y-flow during the negative half cycle is greater than the cumulative y-flow in the positive half-cycle, the device angle is taken to be +90 degrees and otherwise, the device angle may be taken to be −90 degrees as indicated in Equation (24):

$$\theta_k = \begin{cases} 90 & \text{if } dy_{cum} \text{ in } NHC > dy_{cum} \text{ in } PHC \\ -90 & \text{else} \end{cases} \quad (24)$$

Figure 9:
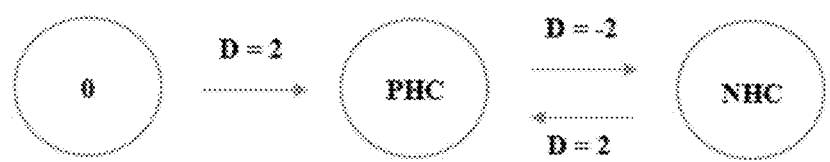
FIG. 9 is a schematic representation of a state machine for determining a dangling context according to an embodiment.

In one embodiment, a state machine may be used to keep track of whether the device is currently in the positive or negative half cycles of the dangling motion. An example state machine is depicted in FIG. 9. Beginning in the initialization state, a positive spike in the differenced binary thresholded flow signal (such as for example a value of +2) indicates that the device is experiencing a change from negative to positive flow and transitions the system to the PHC state. During the PHC state, a negative spike in the differenced binary thresholded flow signal (such as for example a value of −2) transitions the system to the NHC state, whereupon a positive spike transitions the system back to the PHC state. The x- and y-flow values are integrated in each half-cycle and used in accordance with equations above to obtain a value for the dangling use case device angle.

As an illustration, when a device angle is approximately zero degrees, a strong flow in the positive x-direction may be expected with minor oscillations occurring in the y-direction due to optical flow from the left to the right side of the field of optical sensor 114, with a small amount of motion vertically due to the disturbances arising from the user's hand movements and steps. When a device angle is approximately 90 degrees, strong flow in the y-direction may be expected with a reduced, and possibly noisy, x-flow. Corresponding behavior may be expected for the orientations of 180 and −90 degrees. The arctangent of the optical flows may be used to estimate the device angle with respect to the user. Further, the optical flows may be smoothed if desired, such as by using a moving average window size of a suitable number of samples before calculating the device angle. As an illustration only and without limitation, the moving average window may be approximately 15 samples.

With respect to 214, optical navigation module 116 may provide a navigational constraint corresponding to elevation following the above determinations.

In one aspect, a navigational constraint may be derived by distinguishing whether meaningful motion of device 100 corresponds to motion along a single floor or motion between floors or other discrete changes in elevation. Distinctions between single floor and multi floor motion may also depend on the use case determined for device 100. For example, single floor calling mode may be distinguished from multi floor calling mode by examining the ratio of the leveled horizontal and vertical components of the aggregated optical flow after integration over a small window in time. Assuming the user moved in equal amounts in the horizontal and vertical direction with traversal of each step, the ratio of the vertical to horizontal flow over a small window in time should approach unity. As a practical matter, fluctuations around unity may be present dependent on the characteristics of a specific user's gait. Correspondingly, a suitable threshold around unity may be used to identify when device 100 is moving between floors as opposed to remaining on a single floor. Motion along a single floor may be taken to correspond to a context exhibiting substantially constant altitude. For example, portable device may experience transitory changes in elevation, such as may be associated with different use cases including on ear, texting, dangling, or the like. For the purposes of this disclosure, these transitory changes may be considered to exhibit substantially constant altitude as opposed to discrete changes in elevation that correspond to travel between floors or other similar motion. When travelling between floors, the sign of the vertical component of the aggregated flow at that time may be used to determine whether the direction of motion is up or down.

Figure 10:
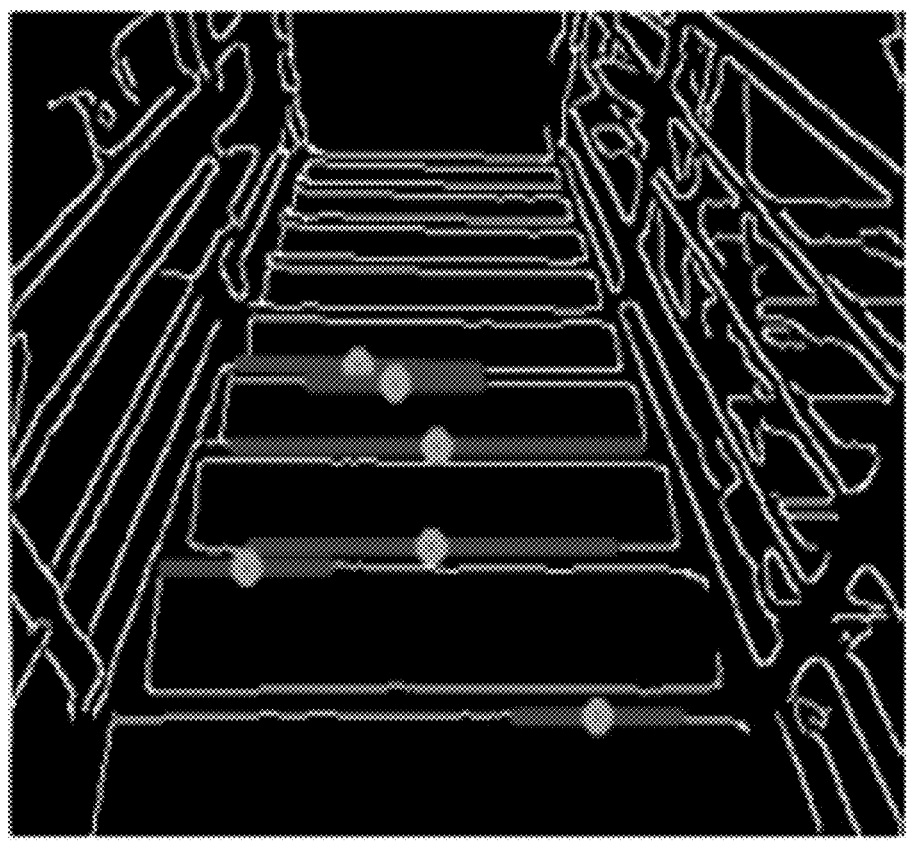
FIG. 10 is a representation of a processed optical sensor image showing identified features corresponding to stair treads according to an embodiment.

As another example, single floor texting mode may be distinguished from multi floor texting mode by identifying a feature in the plurality of samples from optical sensor 114. For example, identifying a feature may include performing edge detection and searching for spatially periodic groups of perpendicular lines that reflect the presence of stairs, as no such periodic lines are typically present when traversing a single floor. In one embodiment, individual stairs may be identified using a Hough transform following edge detection. As depicted in FIG. 10, canny edge detection and the Hough transform allow identification of individual steps in a flight of stairs. In another embodiment, a Gabor filter may be used at the spatial frequency of the steps, followed by further searching for candidate lines for the individual stairs in the image using a combination of the Hough transform and the surrounding optical flow.

Direction of travel in multi floor texting mode may be determined depending on the current pitch, roll, and device angle values. For device angles around 0 or 180° and pitch angles around 0° (i.e. phone held primarily facing the ground in a portrait orientation) or device angles around 90 or −90° and roll angles around 0 or 180° (i.e. phone held primarily facing the ground in a landscape orientation), the images may be analyzed for multiple shrinking lines that arise within the stair borders due to the perspective of projecting a three-dimensional downward stairwell onto the two-dimensional image plane. Therefore, a positive in this test may be used to indicate downwards motion while a negative may be used to indicate motion upwards. In another aspect, the number of lines detected may be monitored under the assumption that when device 100 is travelling down a staircase, there will be a sudden detection of a large number of lines in the field of view of optical sensor 114 as opposed to an upward direction of travel when only a few stair edges are in view. In yet another aspect, the ratio of the leveled horizontal and vertical components of the aggregated optical flow after integration may be analyzed over a small moving window. As there is a decreased distance of the observed ground plane relative to the camera when travelling upwards on stairs, the pixels undergo movement at a faster relative velocity and a greater flow ratio is seen in the axis that aligns with the direction of motion when travelling up stairs than that seen when travelling down. A clear boundary may be observed between the flow ratios in each of the two directions when the device is held at greater pitch angles.

Figure 11:
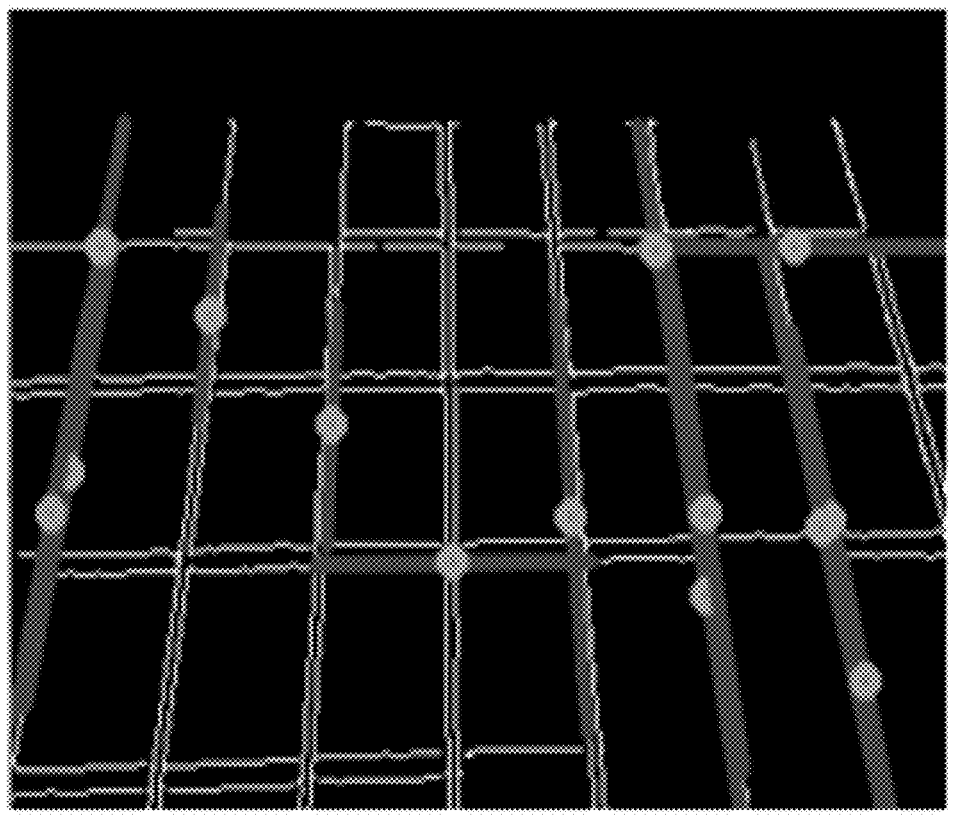
FIG. 11 is a representation of a processed optical sensor image showing identified features corresponding to a tile floor according to an embodiment.

As desired, suitable techniques may be used to distinguish between the visual patterns associated with stairs or other multi floor features and patterns that are not associated with a relative change in elevation. For example, a common material used for floors are tiles, which exhibit perpendicular lines that may be mistaken for stair edges. The results of an edge detection process is shown in FIG. 11. As can be seen in comparison to FIG. 10, the tiled surface exhibits a greater number of lines parallel to the direction of motion. Correspondingly, when the ratio of parallel to perpendicular lines exceeds a suitable threshold, optical navigation module 116 may be configured to classify the context of device 100 as being associated with single floor motion rather than multi floor. Other criteria may be employed to distinguish other common patterns that may result in an erroneous determination of multi floor travel.

The determination between single and multi floor motion may be used as a navigational constraint. When single floor motion is indicated, optical navigation module 116 may provide a navigational solution in which the elevation does not change, which may be used as a constraint for an inertial dead reckoning navigation technique, for a reference based navigation technique or for any other suitable method for determining position information for device 100. Further, as discussed above, the values of the x- and y-components of the integrated aggregate flow or edge detection techniques may indicate whether the direction of motion is up or down, which in turn may be used as a navigational constraint. Other techniques may be used to obtain direction information as well, such as the tracking of individual features using sparse optical flow. When multi floor motion is indicated, a relative change in elevation may be determined and likewise supplied as a navigational constraint.

In one aspect, oscillations in the flow signals may provide a measure of the steps taken. For example and without limitation, a peak detection analysis on the variance signal may be used to estimate individual steps and summed to provide a measure of the amount of steps traversed. Each step may correspond to a peak, such as depicted in FIG. 8. Coupled with information regarding the height of the individual steps, optical navigation module 116 may correspondingly provide a measure of the total height change undergone by device 100 as a navigational constraint. Alternatively or in addition, other suitable techniques may be used to estimate the height change. In one aspect, the duration of time that stair traversing is detected can be used to estimate the total height change. In another aspect, a constant motion model (e.g., constant speed along with the duration) can be used to estimate the total height change. In another aspect, an assumed elevation difference between floors when motion on stairs is detected followed by apportion on a same floor is detected (whether long or short) can be used to estimate the total height change. In yet another aspect, detection of individual steps, such as through inertial sensor 114, can be used with an assumed constant step height to estimate the total height change. In order to estimate an elevation change from the total height change obtained by any one or any combination of the above techniques, the following may be used. An upward or downward motion may be determined as described earlier and utilized to know if the total height change is upward or downward and change the estimated elevation accordingly.

Such techniques may be extended to escalators and other structures as desired with suitable modification. In another aspect, optical navigation module 116 may identify an external source of elevation information in one or more of the samples captured by optical sensor 114. For example, an elevator commonly displays a number or other visual indication representing of each floor as it is traversed. Using template matching and correlation, the floor numbers may be deduced as they change to determine the current floor and estimate a corresponding elevation or to estimate relative change in elevation during the ride. Furthermore, optical sensor 114 may also capture the image of a sign outside an elevator or flight of stairs showing the current floor. Likewise, room numbers and the other designations may follow a pattern that indicates the current floor. Any suitable source of equivalent information may be used to determine absolute elevation or relative elevation change for use as a navigational constraint.

With respect to 216, optical navigation module 116 may also analyze the captured samples to estimate a speed of device 100, which in turn may be used as a navigational constraint. In one embodiment, the flow map F may be used to estimate the 2D velocity by splitting F into a square grid and obtaining the averaged overall movement in each cell divided by the frame rate. A scale factor may be used to translate the pixel translations into real-world velocities. Different techniques may be used to estimate distance to detected objects within the samples to derive the scale factor depending on the context of device 100. With suitable normalization, a scalar speed of portable device 100 may be determined from the samples and used as a navigational constraint. Further, the speed may be resolved into a velocity vector with respect to a body frame of reference or a fixed frame of reference if desired. As will be appreciated, a speed estimate determined using samples from optical sensor 114 may be used to aid specific scenarios where traditional accelerometer-based methods may offer insufficient accuracy. Examples of these scenarios include estimation of the speed when the user is on a conveyor belt, estimation of wheelchair speed, and other similar conditions.

Figure 12:
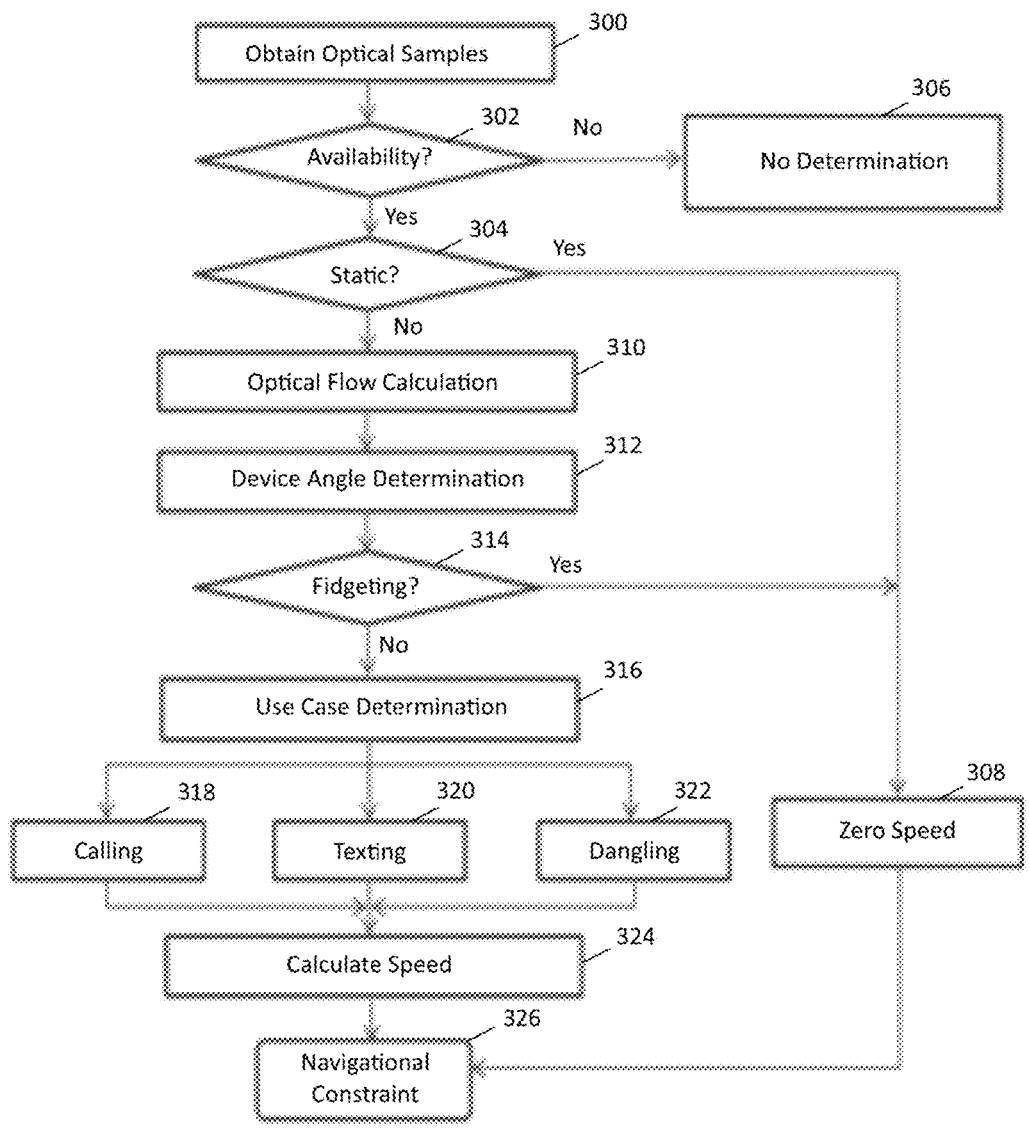
FIG. 12 is a flowchart showing a routine for estimating a speed for a portable device according to an embodiment.

As noted above, in some embodiments speed estimation for device 100 may depend on the current use case, such as dangling, texting or calling. To help illustrate, a suitable routine for estimating speed is shown in FIG. 12, representing exemplary operations that may be performed by optical navigation module 116. Beginning with 300, samples may be obtained from optical sensor 114. In 302, the availability of one or more objects as detected by optical sensor 114 may be assessed. If sufficient objects are detected, the routine continues to 304 but otherwise exits at 306. The samples may be analyzed in 304 to detect whether device 100 is in a static state. If so, the routine may branch to 308 and determine the current speed of device 100 is zero. Otherwise, optical navigation module 116 may then process the samples in 310 by performing optical flow calculations as described above. In 314, variance of the determined device angles may be assessed to determine whether motion of device 100 is meaningful or whether it may be characterized as fidgeting. When a determination of fidgeting is made, the routine may branch to 308 by determining that the speed of device 100 is zero. Otherwise, optical navigation module 116 may classify a use case for device 100 using any suitable technique(s), including those described below. Accordingly, in 318 the use case of device 100 may be classified as calling, in 320 the use case of device 100 may be classified as texting and in 322 the use case of device 100 may be classified as dangling. Depending on the use case classification, an appropriate calculation of device speed may be made in 324, such as by using the algorithms described below. In 326, a navigational constraint may be applied when determining a navigation solution for device 100, such as the speed calculated in 324 or a speed of zero as determined in 308.

Figure 13:
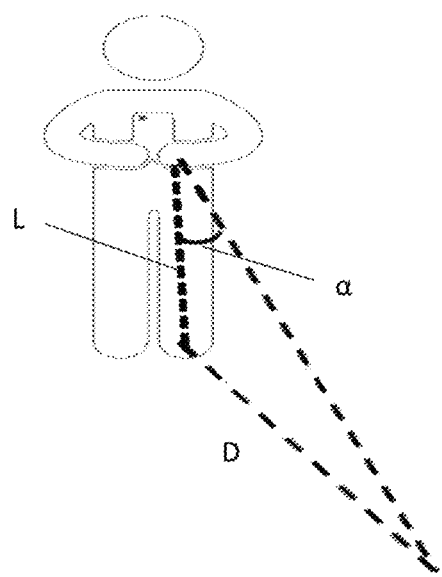
FIG. 13 is schematic diagram showing distance determination in a texting context according to an embodiment.

In one embodiment, optical navigation module 116 may determine device 100 is in a texting mode, such as by using the techniques described above. It may be assumed a user will be walking inside a hall or along a corridor. Although the possibility of catching images for a wall may be relatively small, there is a greater chance that the ground will appear samples captured by optical sensor 114. To estimate the horizontal distance D between the human and a corresponding center point in the image, an inclination angle α of device 100, which may be reported by inertial sensor 112, and the average vertical distance L between device 100 and the ground as depicted in FIG. 13 may be used as indicated by Equation (25):

$$D = L \cdot \tan(\alpha) \tag{25}$$

Figure 14:
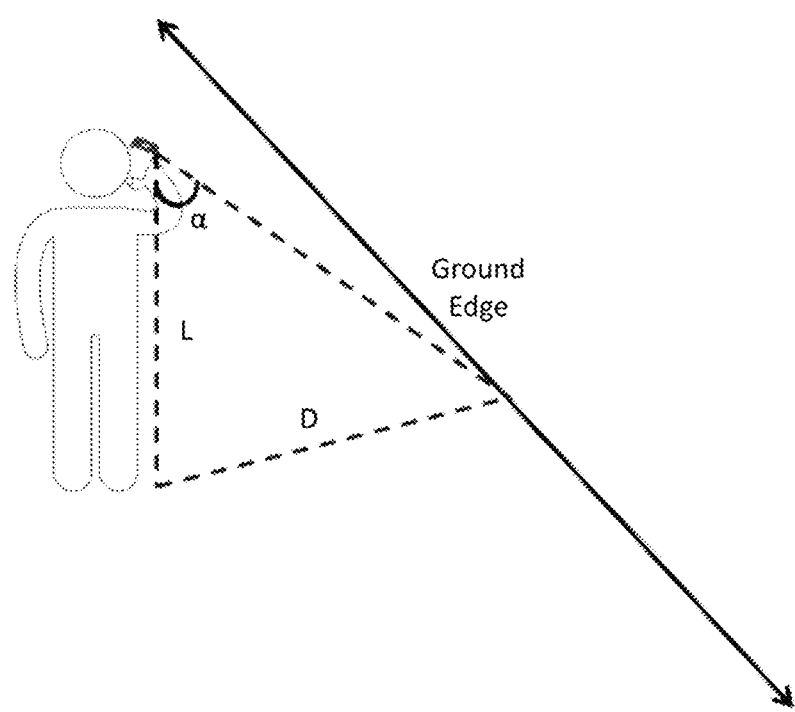
FIG. 14 is schematic diagram showing distance determination in a calling context according to an embodiment.

In one embodiment, optical navigation module 116 may determine device 100 is in an on ear mode, also by using the techniques described above. In this orientation, the possibility of capturing images for a wall is relatively high. This configuration is shown in FIG. 14, such that the depth D between the user and the edge of the wall may be estimated using the average vertical distance L and inclination angle α of device 100 according to Equation (25) above. If the user is in an open area without walls, distance estimation using a point on the ground may be performed as described above.

Figure 15:
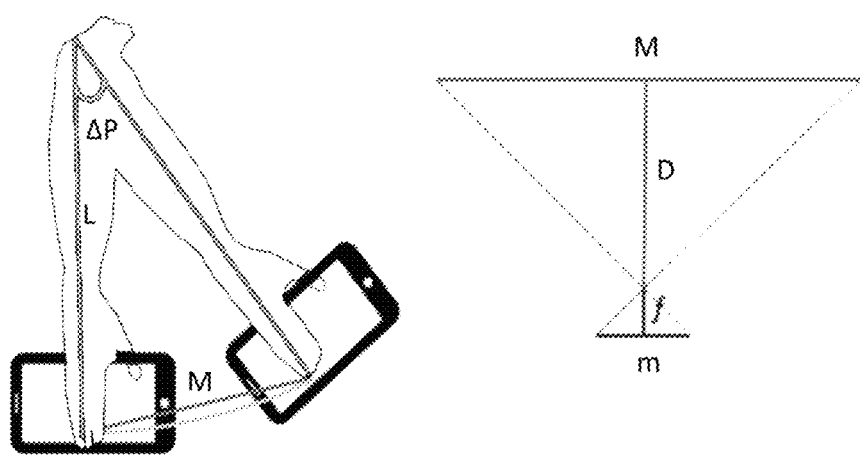
FIG. 15 is schematic diagram showing distance determination in a dangling context according to an embodiment.

In one embodiment, optical navigation module 116 may determine the user is dangling device 100, but not moving. As discussed above, a dangling condition may be detected when the Fourier transform of the flow values indicates a strong periodic component. The swinging motion characteristic of dangling may facilitate calculating the displacement of a featured point inside an image, and correspondingly be used to derive an appropriate scale factor and depth between the captured feature point and the navigation frame. As schematically depicted in FIG. 15, a range of motion of the user's arm may result in a displacement distance M of device 100. Using the average length of the human arm L, or a more accurate estimation if available, and the change in pitch angle ΔP during dangling, M may be derived using Equation (26):

$$M = \sqrt{(L - L\cos(\Delta P))^2 + (L\sin(\Delta P))^2} = L\sqrt{2(1-\cos(\Delta P))} \quad (26)$$

In turn, using the known camera focal length f and the displacement distance m of a featured point inside the image allows optical navigation module 116 to calculate the normal distance D between the feature point and device using Equation (27):

$$D = \frac{f \cdot M}{m} \quad (27)$$

This method may be extended to situations when the user dangles device 100 during walking or other motion by using previous velocity information. When previous velocity information is unavailable, a suitable estimate may be determined iteratively by applying the above techniques.

As previously discussed, the aggregate translation, $dx_{agg,k}$ and $dy_{agg,k}$, between images $G_k$ and $G_{k-1}$ may be provided by the optical flow calculations according to Equations (17) and (18). In one embodiment, dividing the x- and y-components of the aggregate image translation by the time interval between images Δt gives the relative velocity in units of pixels per unit time (e.g. pixels per second) as indicated by Equations (28) and (29), respectively:

$$vx_{rel,k} = \frac{dx_{agg,k}}{\Delta t} \quad (28)$$

$$vy_{rel,k} = \frac{dy_{agg,k}}{\Delta t} \quad (29)$$

To obtain the absolute velocity, an appropriate scale factor c may be used to translate the velocity from units of pixels per unit time to the desired units (e.g. meters per second) according to Equations (30) and (31) respectively. The speed of the user can be calculated using equation (32):

$$vx_k = c^* vx_{rel,k} \quad (30)$$

$$vy_k = c^* vy_{rel,k} \quad (31)$$

$$speed_{user} = \sqrt{vx_k^2 + vy_k^2} \quad (32)$$

In one aspect, scale factor c may be derived from the pixel pitch of optical sensor 114 and the distance to a reference object determined as described above. Setting p as the pixel pitch of the image sensor, f as the effective focal length of optical sensor 114, d as the size of the object in the real-world, r as the real-world range/depth to the object and α as the angular size of the object as viewed from the camera results in the relationship indicated by Equation (33):

$$\alpha = \frac{p}{f} = \frac{d}{r} \quad (33)$$

Application of this relationship may be illustrated by the following example. Given an optical sensor 114 having a pixel pitch of 100 microns (i.e. p=100×10⁻⁶ m) and an effective focal length of 10 000 microns (i.e. f=10 000×10⁻⁶ m), the angular size of each pixel is given by Equation (34):

$$\alpha = \frac{p}{f} = \frac{100*10^{-6}m}{10000*10^{-6}m} = 0.01 \text{ rad} \quad (34)$$

Correspondingly, when device 100 is held one meter above the ground (i.e. r=1 m), a single pixel of separation represents a real-world separation of d as indicated by Equation (35):

$$d = \alpha^* r = (0.01 \text{ rad})^*(1.0 \text{ m}) = 0.01 \text{ m} \quad (35)$$

Further, a physical translation of one meter is represented by a pixel translation or optical flow as shown in Equation (36):

$$\frac{1 \text{ m}}{0.01 \text{ m/pixel}} = 100 \text{ pixels} \quad (36)$$

As can be seen from the above, movement at a speed of one meter per second is represented by a pixel translation or optical flow of 100 pixels per second. Thus, the scale factor for translating optical flow in pixels per second into a real-world velocity in meters per second for this example is given by Equation (37):

$$c = \frac{1 \text{ metre/sec}}{100 \text{ pixels/sec}} \quad (37)$$

Figure 16:
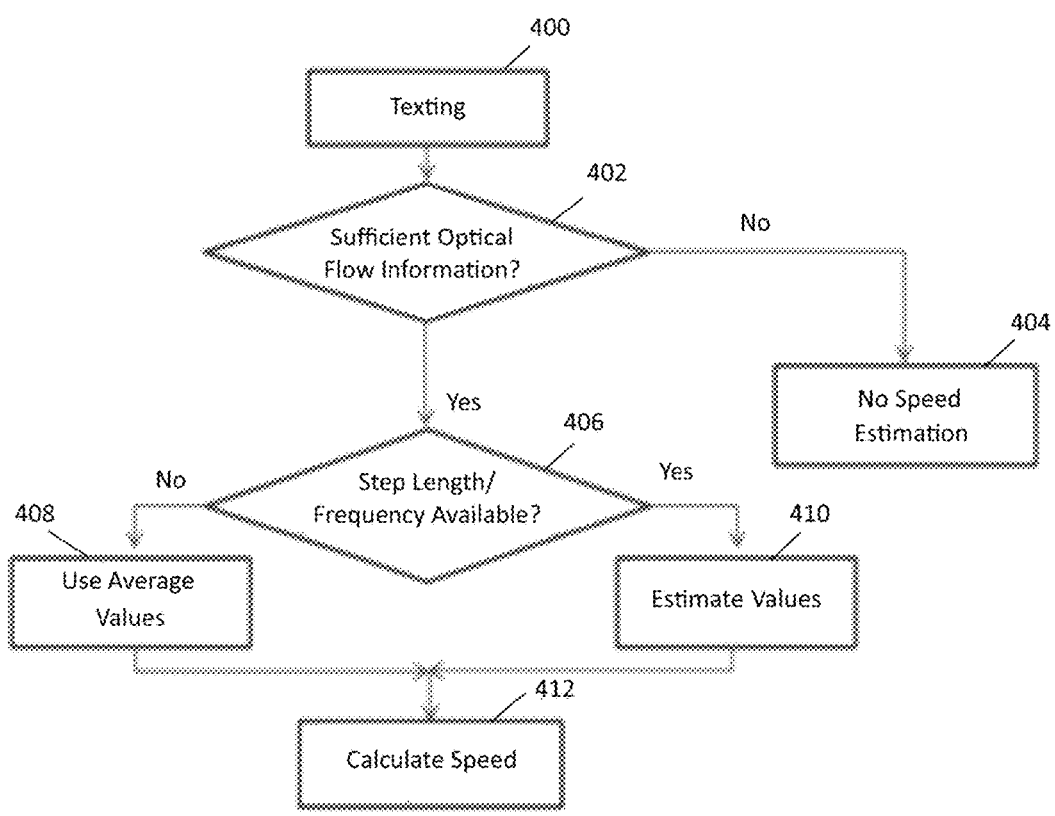
FIG. 16 is a flowchart showing a routine for estimating a speed in a texting use case according to an embodiment.

One suitable routine for estimating speed when device 100 is categorized as being in a texting use case is represented in FIG. 16. Beginning with 400, optical navigation module 116 may determine device 100 is in a texting use case. In 402, a check may be performed to determine if sufficient optical flow information exists to progress. If not, the routine exits to 404 and no speed estimation is made. Otherwise, the routine progresses to 406 and branches depending on whether user dynamics such as step length and/or frequency information for the user of device 100 are available. This information may be input manually by the user or may be determined in any other suitable manner. In one aspect, estimates of this information may be derived from an absolute navigation source such as GNSS. It should be appreciated that GNSS availability may vary depending on the quality of satellite reception. However, estimates of user dynamics including step length and/or frequency may be made during periods of good satellite availability and these estimates may then be applied at other times when GNSS information may not be available. Accelerometer readings from the portable device may be used to detect steps, and absolute navigation information during good availability may be used alongside this information to calculate step length and possibly speed. The dynamics information if available may be used to calculate values such as the user height. The user height may be used in usages such as calling or texting. In case of calling the user height can be used, for texting a height of the portable device from the ground can be calculated from the user height. If the user dynamics information is not available, the routine may use average values for the user height as indicated by 408, and if the user dynamics information is available, the routine may use user height values estimated from the information as indicated by 410. In case of using average values for user height, these may come from predetermined values saved and used by the routine (such as for example average human height) or from user input values (that the user may input manually). Using the values established in either 408 or 410 as appropriate, optical navigation module 116 may then calculate speed in 412.

Figure 17:
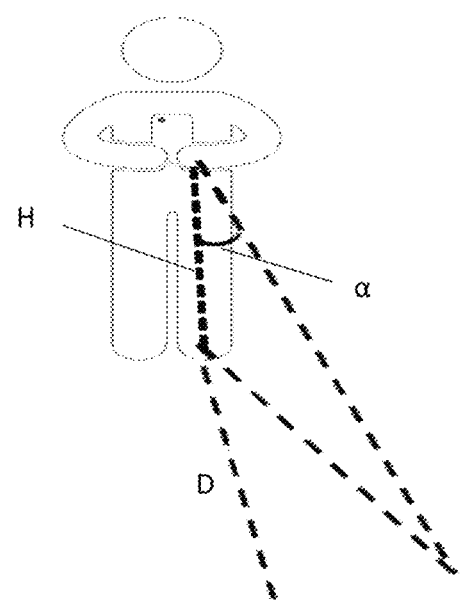
FIG. 17 is another schematic diagram showing distance determination in a texting use case according to an embodiment.

Another texting use case is depicted in FIG. 17 depicts a user with device 100 in a calling use case, where α is the inclination angle of device 100 and may be calculated from the pitch and roll angles, such as from inertial sensor 112 and H may be based on the user height for a texting position (i.e. in texting case H is the height of the portable device from the ground and may be calculated from the user height), for which either an average value or an estimated value may be used as described above. The forward optical flow u may be calculated using the device angle (misalignment angle) (θ) and the calculated optical flows in the x and y directions using Equation (38). Equation (39) calculates the user forward displacement in pixels (d) where Δt is the time interval between each two consecutive frames and N is the number of pixels used to calculate the forward optical flow u. Equation (40) may be used to calculate the user forward displacement D in meters where f is the camera focal length in pixels.

$$u = dx_{agg,k} \cos(\theta) + dy_{agg,k} \sin(\theta) \tag{38}$$

$$d = \frac{u \Delta t}{N} \tag{39}$$

$$D = \frac{H}{\cos(\alpha) f} d \tag{40}$$

Figure 18:
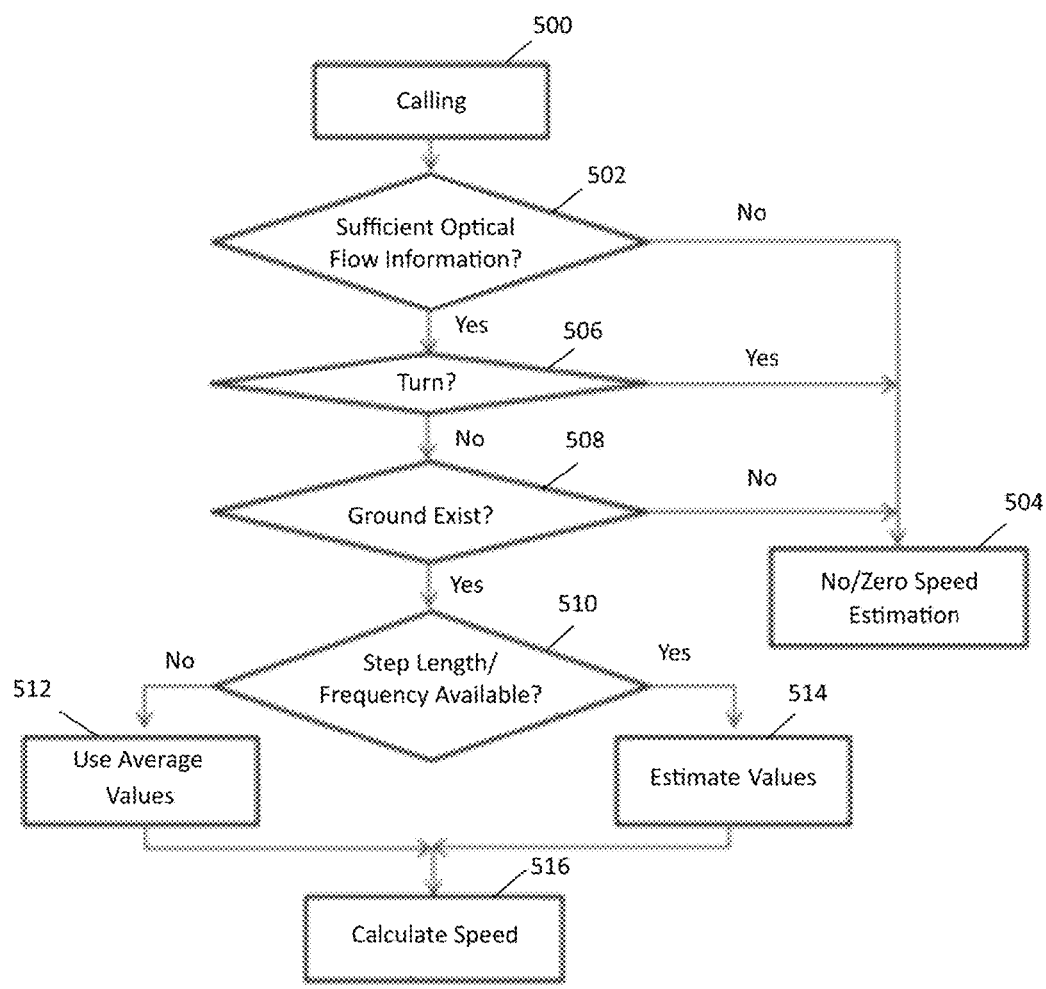
FIG. 18 is a flowchart showing a routine for estimating a speed in a calling use case according to an embodiment.

One suitable routine for estimating speed when device 100 is categorized as being in a calling use case is represented in FIG. 18. Beginning with 500, optical navigation module 116 may determine device 100 is in a calling use case or an "on ear mode." In 502, a check may be performed to determine if sufficient optical flow information exists to progress. If not, the routine exits to 504 and no speed estimation is made. Otherwise, in 506 it is determined whether the user is engaging in a turn. For example, the optical flow calculation and/or heading of device 100 may be analyzed to detect whether a turn is occurring. If so, the routine again exits at 504 and it may be estimated that the current speed is zero. Otherwise, a check is made in 508 to ascertain whether a feature corresponding to the ground may be identified in the images. If not, no speed estimation is made and the routine exits at 504. Otherwise, the routine progresses to 510 and branches depending on whether step length and/or frequency information for the user of device 100 are available as discussed above. If the user dynamics information is not available, the routine may use average values for the user height as indicated by 512, and if the user dynamics information is available, the routine may use user height values estimated from the information as indicated by 514. In case of using average values for user height, these may come from predetermined values saved and used by the routine (such as for example average human height) or from user input values (that the user may input manually). Using the values established in either 512 or 514 as appropriate, optical navigation module 116 may then calculate speed in 516.

Figure 19:
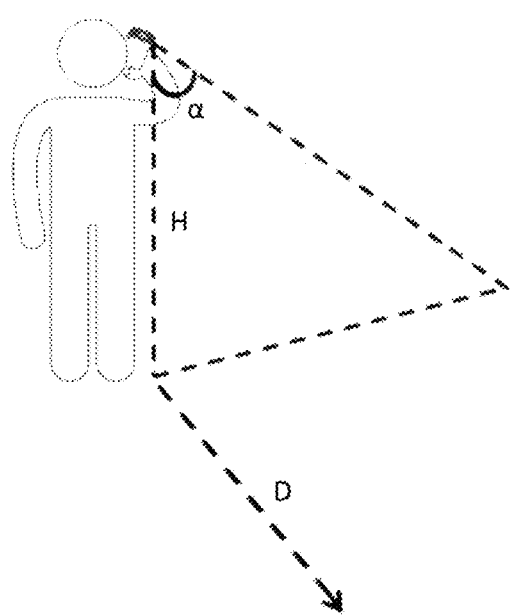
FIG. 19 is schematic diagram showing distance determination in a calling use case according to an embodiment.

In a calling use case, or other on ear mode, the expected orientation of device 100 makes the possibility of identifying a ground edge or other feature relatively high. The speed estimation may proceed by estimating a speed for device 100. For example, another calling use case is depicted in FIG. 19, where a is the inclination angle of device 100 and may be calculated from the pitch and roll angles, such as from inertial sensor 112 and H may be based on the user height for a calling position, for which either an average value or an estimated value may be used as described above. Equations (38), (39) and (40) may then be employed in a similar manner to calculate the user forward displacement.

Figure 20:
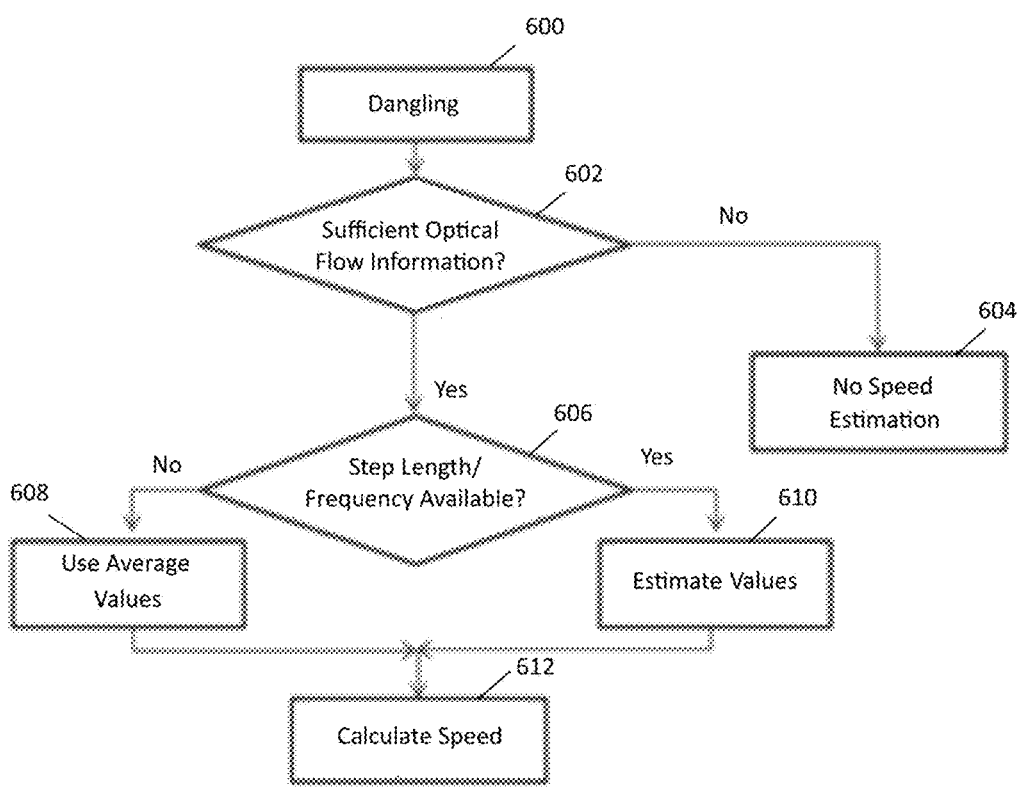
FIG. 20 is a flowchart showing a routine for estimating a speed in a dangling use case according to an embodiment.

One suitable routine for estimating speed when device 100 is categorized as being in a dangling use case is represented in FIG. 20. Beginning with 600, optical navigation module 116 may determine device 100 is in a dangling use case. In 602, a check may be performed to determine if sufficient optical flow information exists to progress. If not, the routine exits to 604 and no speed estimation is made. Otherwise, the routine progresses to 606 and branches depending on whether step length and/or frequency information for the user of device 100 are available, as discussed above. If the user dynamics information is not available, the routine may use average values for the user arm length as indicated by 608, and if the user dynamics information is available, the routine may use the dynamics information to estimate the user arm length values, as indicated by 610 (the dynamics information may be used to derive an estimated user height, and the user height is then used to estimate the user arm length). In case of using average values for user arm length, these may come from predetermined values saved and used by the routine (such as for example average human arm length) or from user input values (that the user may input manually). Using the values established in either 608 or 610 as appropriate, optical navigation module 116 may then calculate speed in 612.

Figure 21:
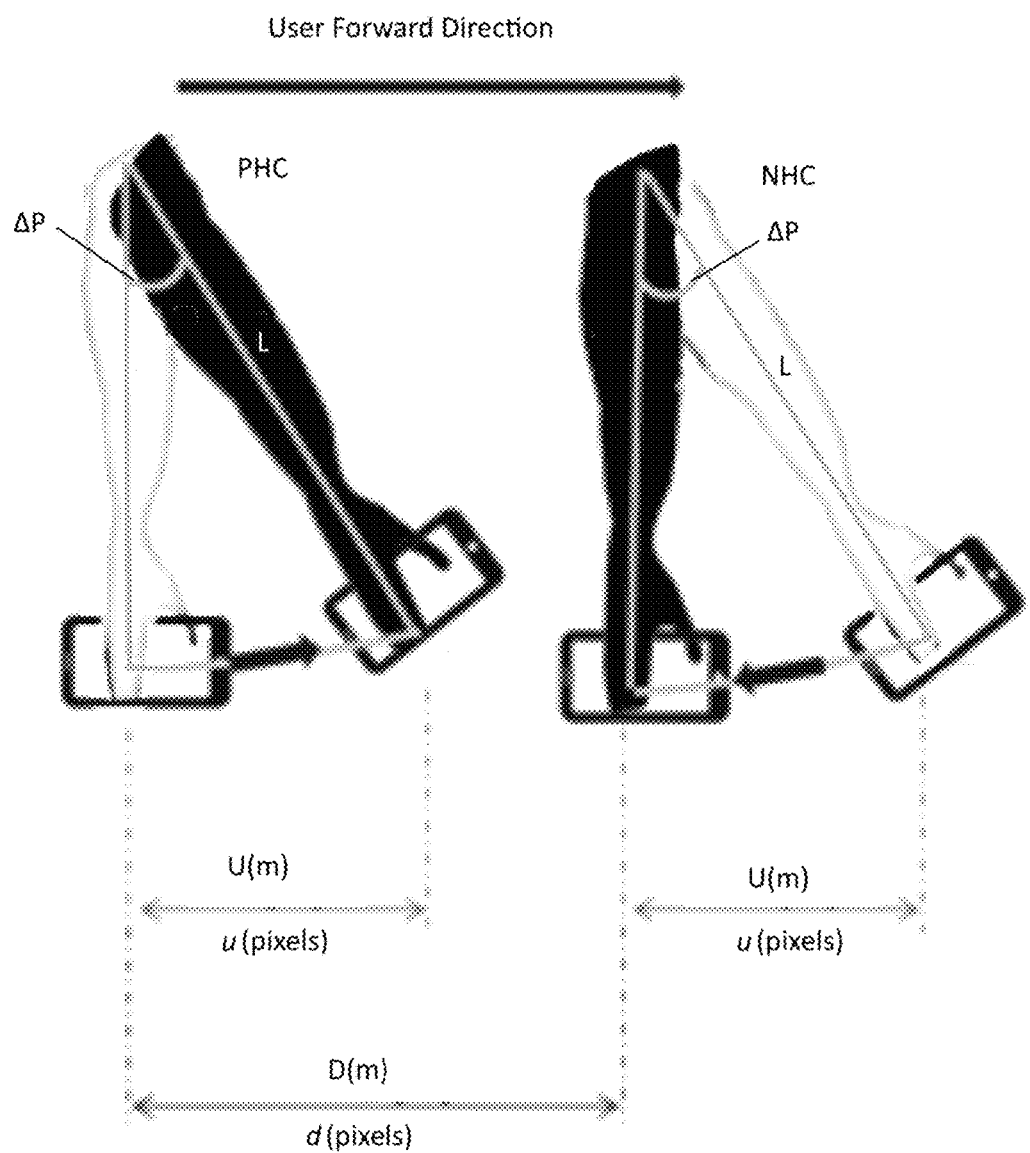
FIG. 21 is schematic diagram showing distance determination in a dangling use case according to an embodiment.

To obtain a speed estimation, pitch and roll angles may be used in the horizontally and vertically dangled devices respectively. Accordingly, FIG. 21 schematically depicts speed estimation for a horizontal dangling use case, employing pitch angles. In a vertical dangling use case, roll angle may be used instead. The optical displacement during the PHC and NHC (A and B) are calculated using Equations (41) and (42) respectively where u is the aggregated optical flow, Δt is the time interval of the PHC and NHC, u and d are the arm and the user displacements in pixels u and d can be calculated using Equations (43) and (44) respectively.

$$A = u\Delta t = -u + \frac{d}{2} \tag{41}$$

$$B = u\Delta t = -u + \frac{d}{2} \tag{42}$$

$$u = \frac{A-B}{2} \tag{43}$$

-continued $$d = A + B \quad (44)$$

The arm displacement in meters (U) may be calculated using Equation (45) where L is the user arm length, $P_1$ and $P_2$ are the first and second arm pitch angles and $\Delta P$ is the difference between them. Again, an average value for arm length may be used or if user dynamics information is available as described above, a more refined estimate particular to the user may be employed. Based on the user displacement in pixels (d) and the arm displacements in pixels (u) and meters (U), the user displacement D in meters can be calculated using Equation (46).

$$U = 2\cos\left(\tan^{-1}\left(\frac{\cos(P_1) - \cos(P_2)}{\sin(P_2) - \sin(P_1)}\right)\right) L \sin\left(\frac{\Delta P}{2}\right) \quad (45)$$

$$D = \frac{U}{u}d \quad (46)$$

Accordingly, using the techniques described above the speed of a user of device 100 may be estimated using the calculated optical flows in the x and y directions for various use case scenarios, including calling, texting and dangling. The above equations may be employed as noted to determine user displacement D. Dividing by the appropriate time interval converts this distance to speed as indicated in Equation (47). For the dangling use case, $\Delta t$ may be the time interval for both PHC and NHC.

$$\text{speed}_{user} = \frac{D}{\Delta t} \quad (47)$$

Different techniques for calculating the relative displacement and/or the speed of the user were presented for each of the device use cases. In some embodiments, the different techniques for calculating the relative displacement and/or the speed for a detected use case can be used and fused together to provide a better estimate.

Absolute velocity information estimation in a known frame such as North-East-Down (NED) frame or East-North-Up (ENU) frame depends on the magnitude of the user speed and direction (the user heading). The heading of the user $H_{user}$ can be calculated using Equation (48) where $\theta_{device}$ is the device angle (misalignment angle) discussed before and $H_{device}$ is the device heading angle which can be calculated using gyroscopes and/or magnetometers sensors of the device, such as inertial sensor 112.

$$H_{user} = H_{device} - \theta_{device} \quad (48)$$

Using the calculated user speed and heading, the absolute velocities in the north and east directions can be calculated using Equations (49) and (50).

$$V_N = \text{speed}_{user} * \cos(H_{user}) \quad (49)$$

$$V_E = \text{speed}_{user} * \sin(H_{user}) \quad (50)$$

Figure 22:
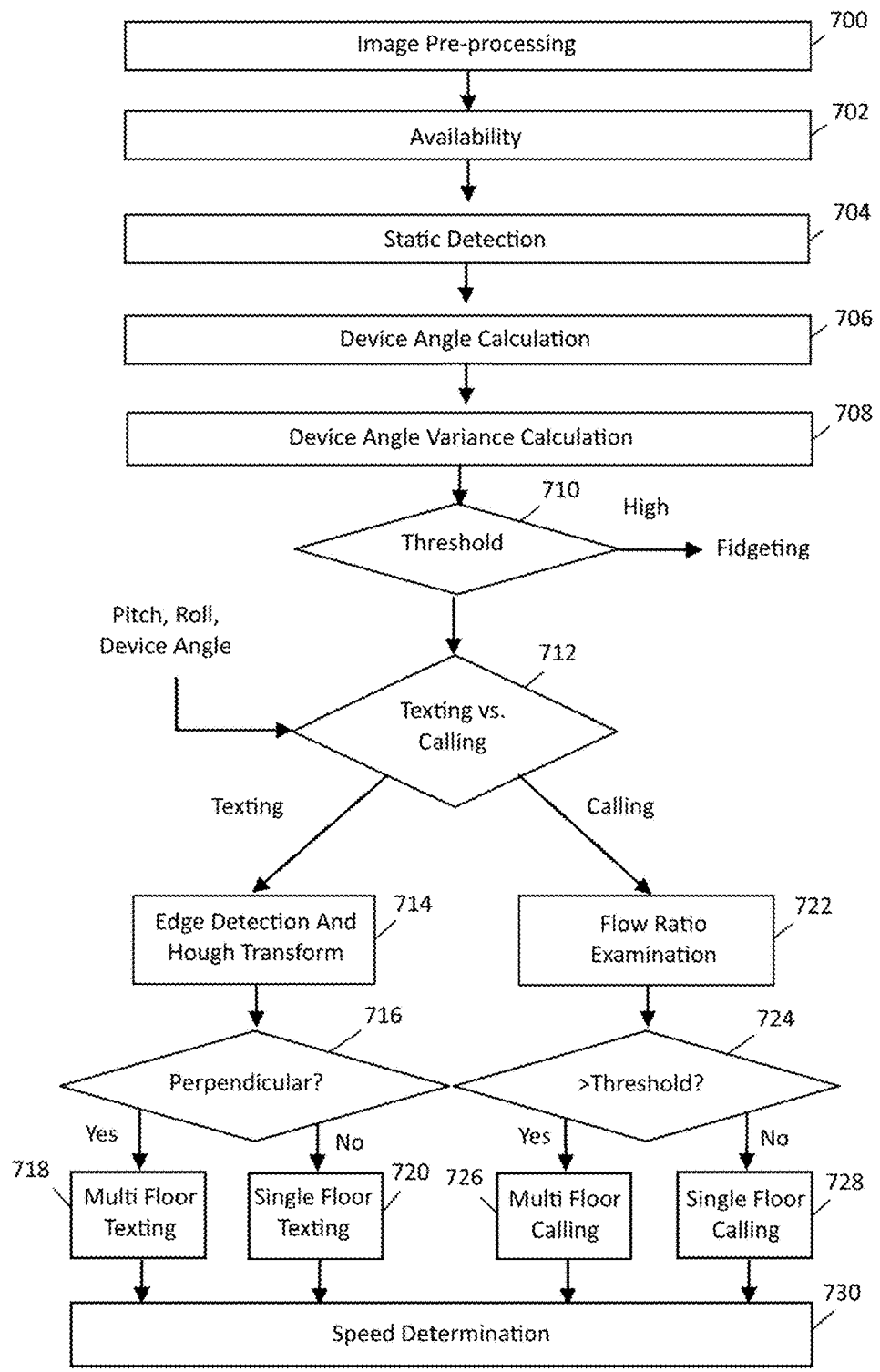
FIG. 22 is a flowchart showing a routine for providing a navigation solution for a portable device according to an embodiment.

As noted above, suitable operations to be performed by optical navigation module 116 in determining one or more navigational constraints may involve any combination of the above techniques. To help illustrate another exemplary embodiment, FIG. 22 represents another routine that may be performed by optical navigation module 116. Beginning with 700, the samples from optical sensor 114 may be subjected pre-processing as desired. In 702, the availability of sufficient detail in the samples may be assessed. Further, the samples may be analyzed to detect whether device 100 is in a motion-less state in 704. Optical navigation module 116 may then process the samples to calculate device angle in 706. The routine then flows to 708, where variance in device angle is assessed over a suitable window of time. The determined variance may be compared to a threshold in 710. If it is determined the variance is over the threshold, optical navigation module 116 may determine device is in a fidgeting context and any motion is not meaningful, ending the routine. Otherwise, when the variance is below the threshold, the motion of device 100 is construed as meaningful and the routine progresses to 712 for discrimination between texting and calling contexts. As described above, pitch and roll measurements from inertial sensor 114, along with the determined device angle, may be used to distinguish these contexts.

Upon determination device 100 is in texting mode, the routine may branch to 714 to perform edge detection, Hough transforms or other suitable operations to detect the presence of stairs in the captured samples. In 716, the identification of stairs may be verified, such as by determining the ratio of parallel lines to perpendicular lines. If the detection of stairs is verified, optical navigation module 116 may determine device 100 is in a multi floor texting context as indicated by 718. Otherwise, optical navigation module 116 may determine device 100 is in a single floor texting context in 720.

The other branch may be followed after determination in 712 that device 100 is in on ear mode. In 722, optical navigation module 116 may analyze flow ratios as described above to distinguish between single floor and multi floor motion. If the flow ratio is above a threshold in 724, optical navigation module 116 may determine device 100 is in a multi floor calling context as indicated by 726. Otherwise, optical navigation module 116 may determine device 100 is in a single floor calling context in 728.

As desired, each of the context determinations corresponding to 718, 720, 726 and 728 may be followed by determination of speed and/or velocity of device 100 in 730.

To illustrate application of the techniques of this disclosure, tests have been conducted for dangling, texting and calling use case scenarios for both indoor and outdoor environments to assess the speed estimation and the total distance traveled obtained from it. Various user speeds have been tested as well; slow, normal and fast speeds.

Figure 23:
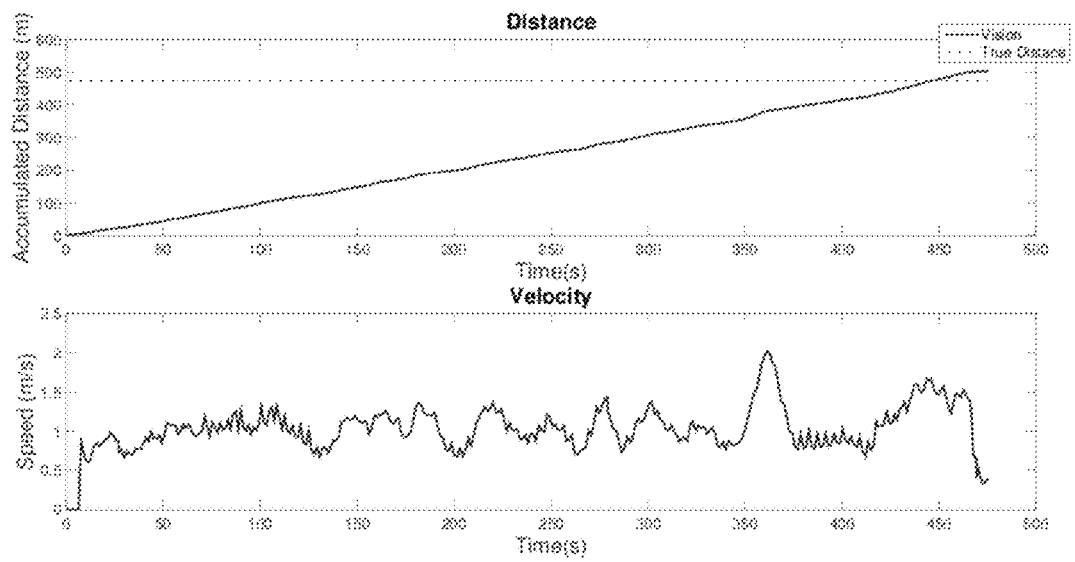
FIGS. 23-25 depict results of an outdoor dangling test at slow, normal and fast speeds according to an embodiment.
Figure 24:
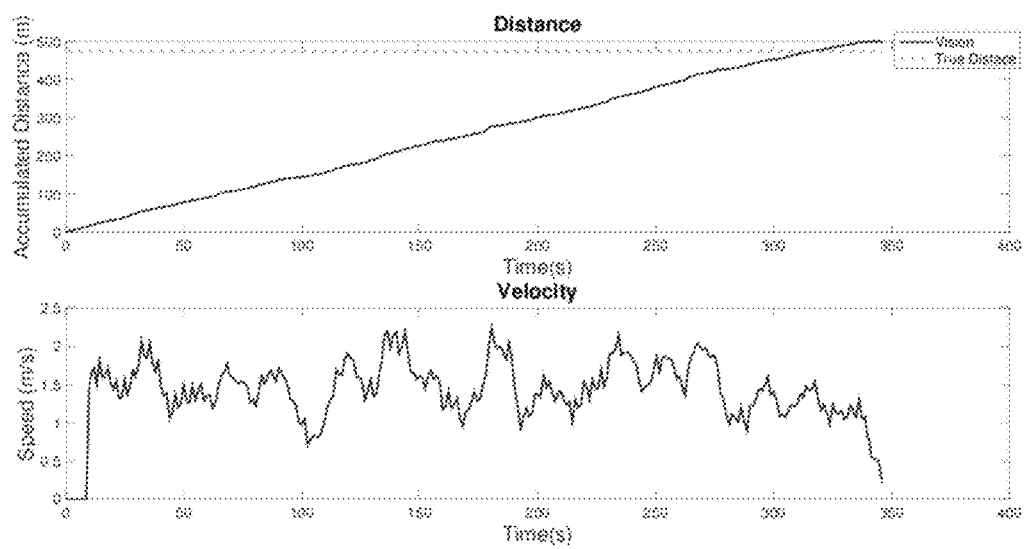
Figure 25:
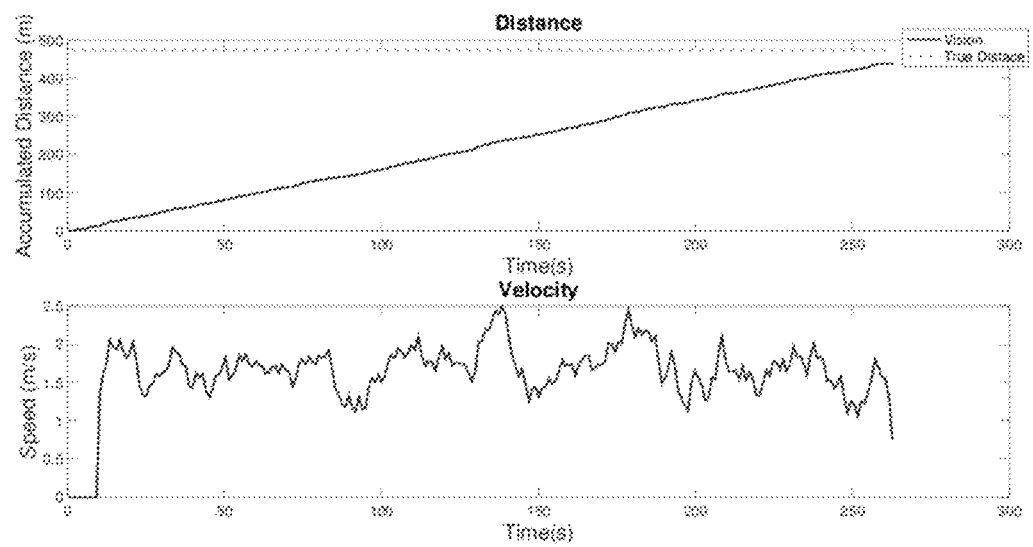

An outdoor test was performed over a loop path of 473 m for a dangling use case. The calculated travelled distance and accuracy using optical sensor 114 of device 100 using the above techniques for slow, normal and fast speeds are listed in Table 1. As will be appreciated, the maximum error of the measured distance was less than 10%. The measured distances and speeds are shown in FIGS. 23-25 for slow, normal and fast speed respectively.

TABLE 1

| Dangling Outdoor | Distance from Vision (m) | Error (%) |
|---|---|---|
| Slow | 499.9 | 5.69 |
| Normal | 499.2 | 5.54 |
| Fast | 436.7 | 7.67 |

Figure 26:
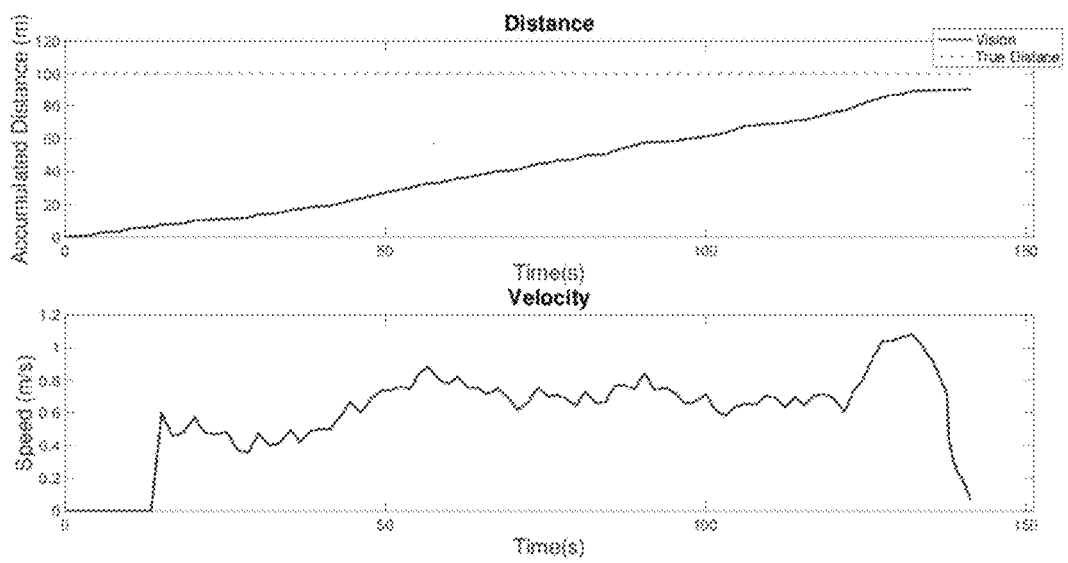
FIGS. 26-28 depict results of an indoor dangling test at slow, normal and fast speeds according to an embodiment.
Figure 27:
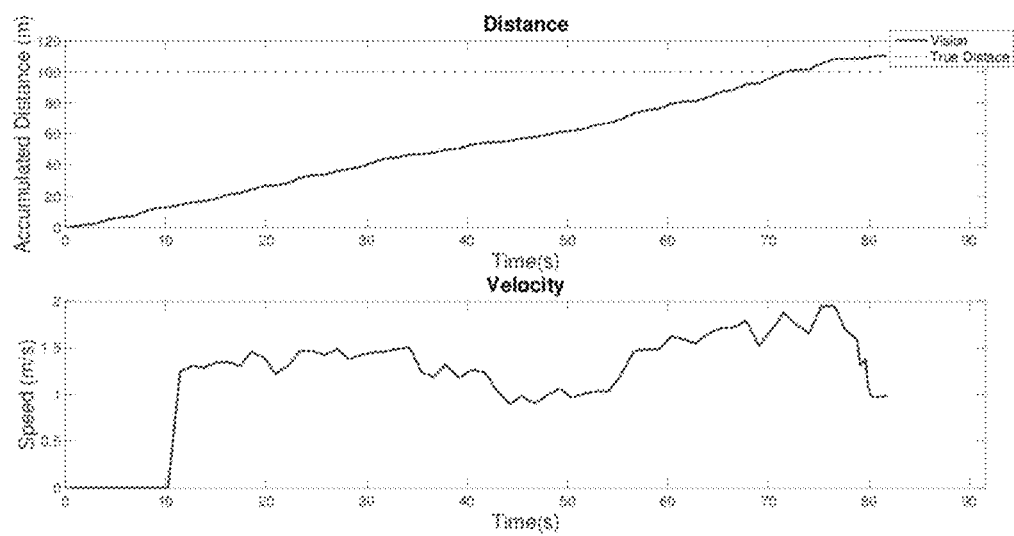
Figure 28:
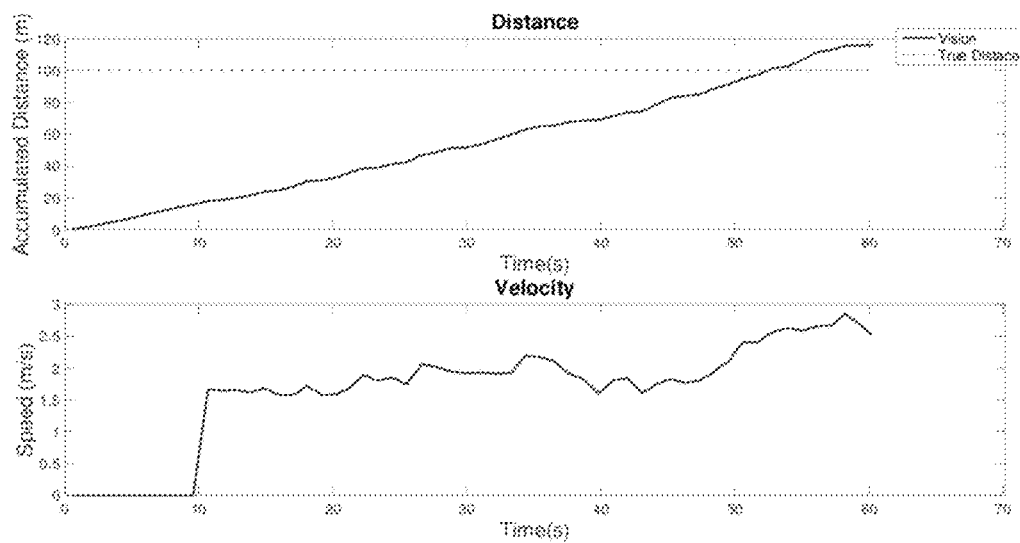

A similar test was performed in an indoor environment, with an out and back path length of 100 m. The results are shown in Table 2, with a maximum obtained error of about 15%. The calculated distances and speeds for slow, normal and fast user speeds are shown in FIGS. 26-28, respectively. Possible explanations for the better accuracy observed outdoors may include the longer path length and that the outdoor environment contains more rich features than the indoor environment for optical flow calculations.

TABLE 2

| Dangling Indoor | Distance from Vision (m) | Error (%) |
|---|---|---|
| Slow | 89.7 | 10.3 |
| Normal | 109.1 | 9.1 |
| Fast | 115.7 | 15.7 |

Figure 29:
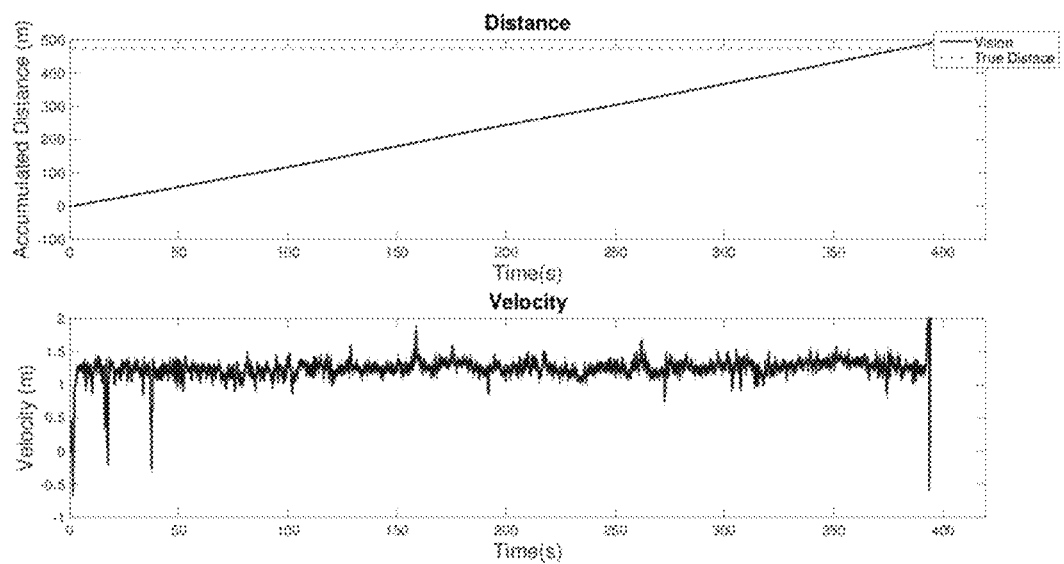
FIGS. 29-31 depict results of an outdoor texting test at slow, normal and fast speeds according to an embodiment.
Figure 30:
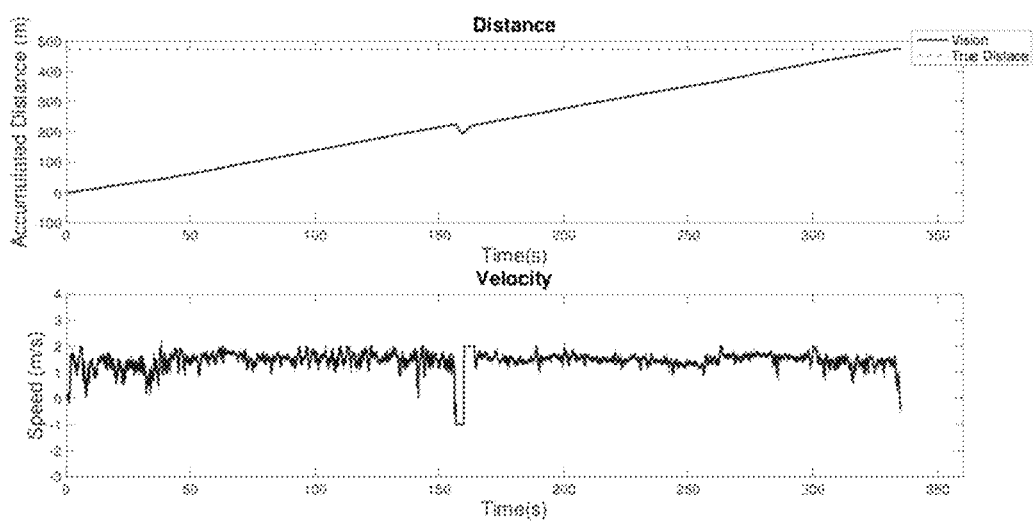
Figure 31:
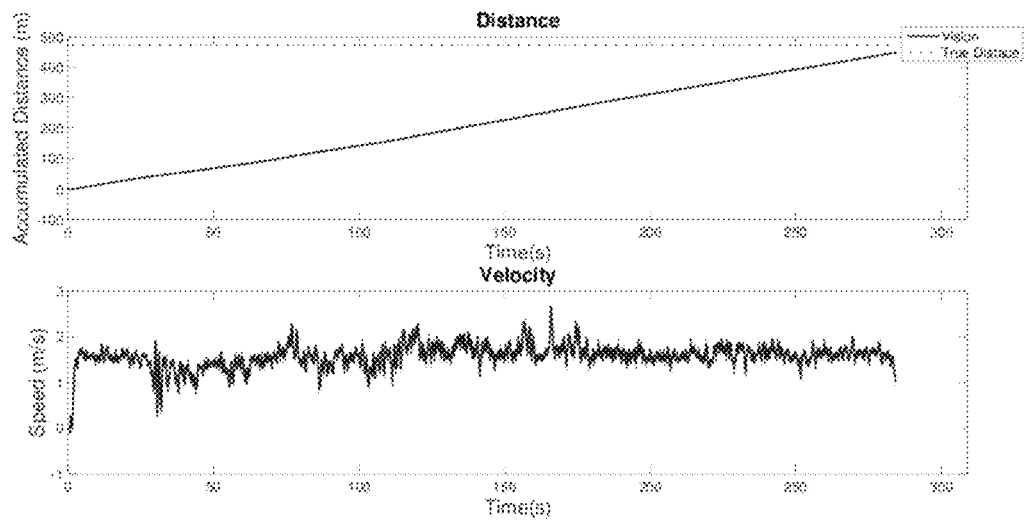
Figure 32:
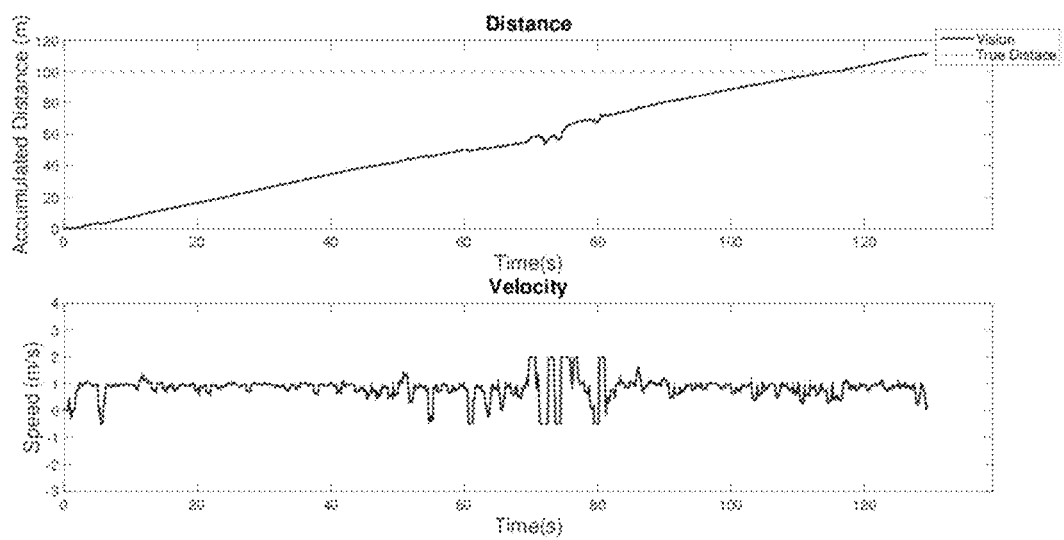
FIGS. 32-34 depict results of an indoor texting test at slow, normal and fast speeds according to an embodiment.
Figure 33:
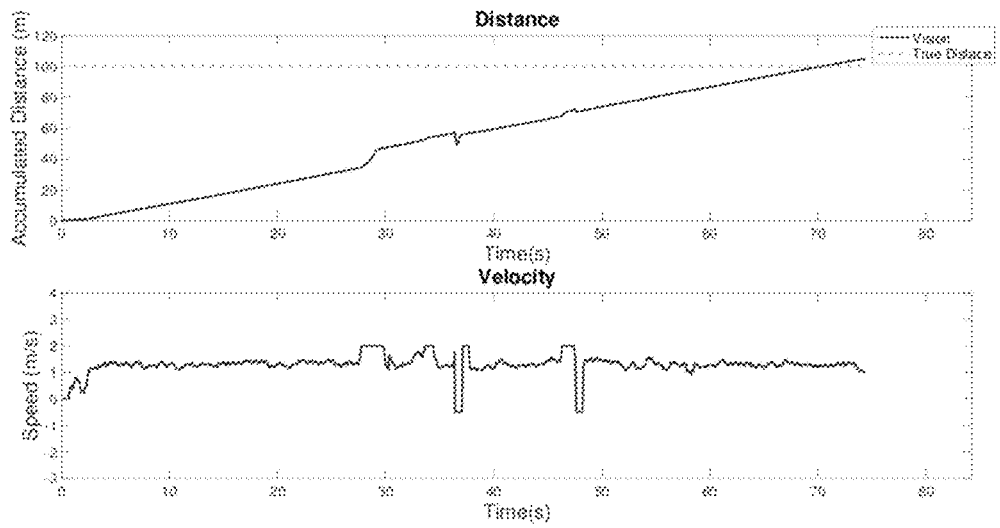
Figure 34:
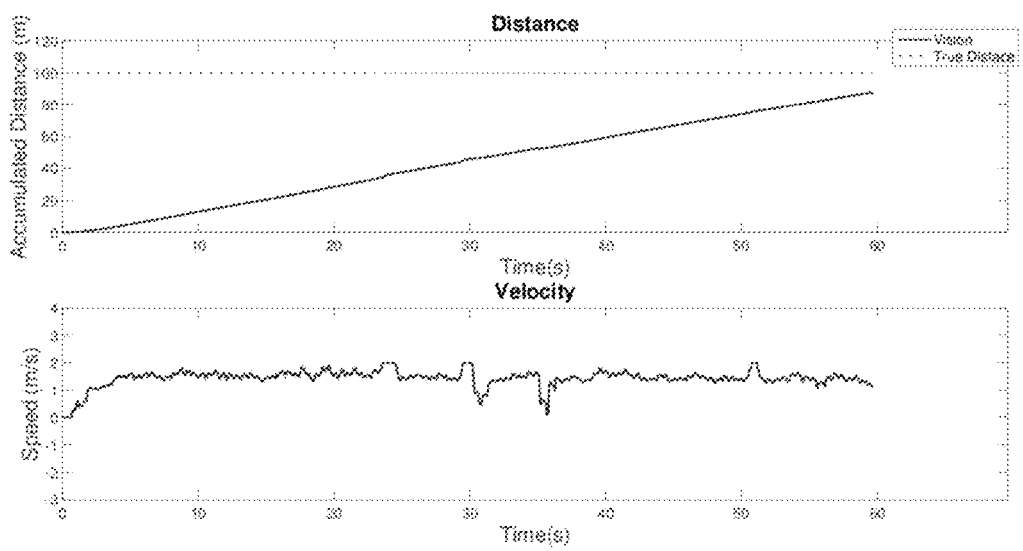

Next, the outdoor and indoor tests were repeated with device 100 in a texting use case. The obtained accurate results for the outdoor test are listed in Table 3, where the maximum resultant error was about 5% and FIGS. 29-31 show the obtained distance and speed results for slow, normal and fast user speeds, respectively. Correspondingly, Table 4 shows the results for the indoor test, where the maximum resulted error was about 12% and FIGS. 32-34 show the obtained distance and speed results for slow, normal and fast user speeds, respectively.

TABLE 3

| Texting Outdoor | Distance from Vision (m) | Error (%) |
|---|---|---|
| Slow | 489.4 | 3.47 |
| Normal | 474.8 | 0.38 |
| Fast | 447.2 | 5.45 |

TABLE 4

| Texting Indoor | Distance from Vision (m) | Error (%) |
|---|---|---|
| Slow | 110.4 | 10.4 |
| Normal | 104.9 | 4.9 |
| Fast | 87.7 | 12.3 |

Figure 35:
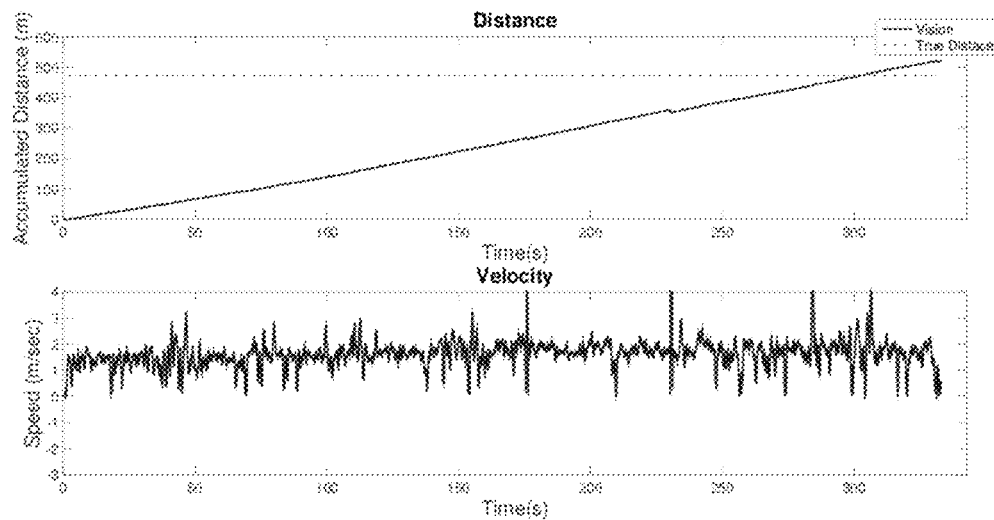
FIG. 35 depicts results of an outdoor calling test at normal speed according to an embodiment.
Figure 36:
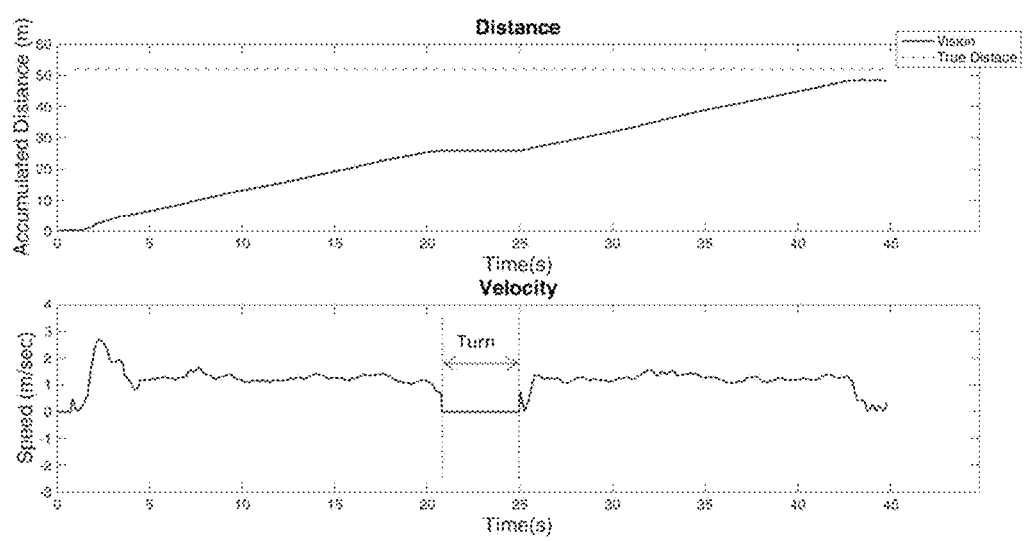
FIG. 36 depicts results of an indoor calling test at normal speed according to an embodiment.

Finally, outdoor and indoor tests were performed with device 100 in a calling use case. The same path was followed for the outdoor test and a shorter, 52 m out and back path was used for the indoor test. Both indoor and outdoor tests were conducted at normal speed. The obtained accurate results for the outdoor test are listed in Table 5, where the error was less than 10% and FIG. 35 shows the obtained distance and speed results. Table 6 shows the results for the indoor test, where the error was less than 7% and FIG. 36 shows the obtained distance and speed results. At the midpoint of the indoor path, the user turned 180° and as indicated, the user speed during the detected turn was assumed to be zero.

TABLE 5

| Calling Outdoor | Distance from Vision (m) | Error (%) |
|---|---|---|
| Normal | 517.1 | 9.32 |

TABLE 6

| Calling Indoor | Distance from Vision (m) | Error (%) |
|---|---|---|
| Normal | 48.6 | 6.54 |

Depending on the architecture of device 100, sensor processor 108 and inertial sensor 112 may be formed on different chips, or as shown, may reside on the same chip. A sensor fusion algorithm employed to calculate the orientation of device 100 may be performed externally to sensor processor 108 and MPU 106, such as by host processor 104, or may be performed by MPU 106. A chip may be defined to include at least one substrate typically formed from a semiconductor material. A single chip may be formed from multiple substrates, where the substrates are mechanically bonded to preserve the functionality. A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits. One or more sensors may be incorporated into the package if desired using any suitable technique. In some embodiments, a sensor may be MEMS-based, such that a MEMS cap provides mechanical support for the MEMS structure. The MEMS structural layer is attached to the MEMS cap. The MEMS cap is also referred to as handle substrate or handle wafer. In some embodiments, the first substrate may be vertically stacked, attached and electrically connected to the second substrate in a single semiconductor chip, while in other embodiments, the first substrate may be disposed laterally and electrically connected to the second substrate in a single semiconductor package. In one embodiment, the first substrate is attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

The techniques of this disclosure may be combined with any navigation solution independent of the type of the state estimation or filtering technique used in this navigation solution. The state estimation technique can be linear, non-linear or a combination thereof. Different examples of techniques used in the navigation solution may rely on a Kalman filter, an Extended Kalman filter, a non-linear filter such as a particle filter, or an artificial intelligence technique such as Neural Network or Fuzzy systems. The state estimation technique used in the navigation solution can use any type of system and/or measurement models. The navigation solution may follow any scheme for integrating the different sensors and systems, such as for example loosely coupled integration scheme or tightly coupled integration scheme among others. The navigation solution may utilize modeling (whether with linear or nonlinear, short memory length or long memory length) and/or automatic calibration for the errors of inertial sensors and/or the other sensors used.

The techniques of this disclosure may be combined with a mode of conveyance technique or a mode detection technique to establish the mode of conveyance. This enables the discrimination of different scenarios such as for example walking and driving among other possible modes.

CONTEMPLATED EMBODIMENTS

The present disclosure describes the body frame to be x forward, y positive towards right side of the body and z axis positive downwards. It is contemplated that any body-frame definition can be used for the application of the method and apparatus described herein.

It is contemplated that the techniques of this disclosure can be used with a navigation solution that may optionally utilize automatic zero velocity periods or static period detection with its possible updates and inertial sensors bias recalculations, non-holonomic updates module, advanced modeling and/or calibration of inertial sensors errors, derivation of possible measurements updates for them from GNSS when appropriate, automatic assessment of GNSS solution quality and detecting degraded performance, automatic switching between loosely and tightly coupled integration schemes, assessment of each visible GNSS satellite when in tightly coupled mode, and finally possibly can be used with a backward smoothing module with any type of backward smoothing technique and either running in post mission or in the background on buffered data within the same mission.

It is further contemplated that techniques of this disclosure can also be used with a mode of conveyance technique or a motion mode detection technique to establish the mode of conveyance. This enables the detection of pedestrian mode among other modes such as for example driving mode. When pedestrian mode is detected, the method presented in this disclosure can be made operational to determine the speed, and/or velocity, and/or device angle (misalignment between the device and the pedestrian).

It is further contemplated that techniques of this disclosure can also be used with a navigation solution that is further programmed to run, in the background, a routine to simulate artificial outages in the absolute navigational information and estimate the parameters of another instance of the state estimation technique used for the solution in the present navigation module to optimize the accuracy and the consistency of the solution. The accuracy and consistency is assessed by comparing the temporary background solution during the simulated outages to a reference solution. The reference solution may be one of the following examples: the absolute navigational information (e.g. GNSS); the forward integrated navigation solution in the device integrating the available sensors with the absolute navigational information (e.g. GNSS) and possibly with the optional speed or velocity readings; or a backward smoothed integrated navigation solution integrating the available sensors with the absolute navigational information (e.g. GNSS) and possibly with the optional speed or velocity readings. The background processing can run either on the same processor as the forward solution processing or on another processor that can communicate with the first processor and can read the saved data from a shared location. The outcome of the background processing solution can benefit the real-time navigation solution in its future run (i.e. real-time run after the background routine has finished running), for example, by having improved values for the parameters of the forward state estimation technique used for navigation in the present module.

It is further contemplated that the techniques of this disclosure can also be used with a navigation solution that is further integrated with maps (such as street maps, indoor maps or models, or any other environment map or model in cases of applications that have such maps or models available), and a map matching or model matching routine. Map matching or model matching can further enhance the navigation solution during the absolute navigation information (such as GNSS) degradation or interruption. In the case of model matching, a sensor or a group of sensors that acquire information about the environment can be used such as, for example, Laser range finders, cameras and vision systems, or sonar systems. These new systems can be used either as an extra help to enhance the accuracy of the navigation solution during the absolute navigation information problems (degradation or absence), or they can totally replace the absolute navigation information in some applications.

It is further contemplated that the techniques of this disclosure can also be used with a navigation solution that, when working either in a tightly coupled scheme or a hybrid loosely/tightly coupled option, need not be bound to utilize pseudorange measurements (which are calculated from the code not the carrier phase, thus they are called code-based pseudoranges) and the Doppler measurements (used to get the pseudorange rates). The carrier phase measurement of the GNSS receiver can be used as well, for example: (i) as an alternate way to calculate ranges instead of the code-based pseudoranges, or (ii) to enhance the range calculation by incorporating information from both code-based pseudorange and carrier-phase measurements; such enhancement is the carrier-smoothed pseudorange.

It is further contemplated that the techniques of this disclosure can also be used with a navigation solution that relies on an ultra-tight integration scheme between GNSS receiver and the other sensors' readings.

It is further contemplated that the techniques of this disclosure can also be used with a navigation solution that uses various wireless communication systems that can also be used for positioning and navigation either as an additional aid (which will be more beneficial when GNSS is unavailable) or as a substitute for the GNSS information (e.g. for applications where GNSS is not applicable). Examples of these wireless communication systems used for positioning are, such as, those provided by cellular phone towers and signals, radio signals, digital television signals, WiFi, or Wimax. For example, for cellular phone based applications, an absolute coordinate from cell phone towers and the ranges between the indoor user and the towers may be utilized for positioning, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. WiFi positioning can be done in a variety of ways that includes but is not limited to time of arrival, time difference of arrival, angles of arrival, received signal strength, and fingerprinting techniques, among others; all of the methods provide different level of accuracies. The wireless communication system used for positioning may use different techniques for modeling the errors in the ranging, angles, or signal strength from wireless signals, and may use different multipath mitigation techniques. All the above mentioned ideas, among others, are also applicable in a similar manner for other wireless positioning techniques based on wireless communications systems.

It is further contemplated that the techniques of this disclosure can also be used with a navigation solution that utilizes aiding information from other moving devices. This aiding information can be used as additional aid (that will be more beneficial when GNSS is unavailable) or as a substitute for the GNSS information (e.g. for applications where GNSS based positioning is not applicable). One example of aiding information from other devices may be relying on wireless communication systems between different devices. The underlying idea is that the devices that have better positioning or navigation solution (for example having GNSS with good availability and accuracy) can help the devices with degraded or unavailable GNSS to get an improved positioning or navigation solution. This help relies on the well-known position of the aiding device(s) and the wireless communication system for positioning the device(s) with degraded or unavailable GNSS. This contemplated variant refers to the one or both circumstance(s) where: (i) the device(s) with degraded or unavailable GNSS utilize the methods described herein and get aiding from other devices and communication system, (ii) the aiding device with GNSS available and thus a good navigation solution utilize the methods described herein. The wireless communication system used for positioning may rely on different communication protocols, and it may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

The embodiments and techniques described above may be implemented in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processer enabled devices in communication with the device, such as a server.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the disclosure is defined and limited only by the claims that follow.

What is claimed is:

1. A method for navigating with a portable device comprising:
   processing a sequence of samples from an optical sensor of the portable device, wherein processing the sequence of samples from the optical sensor comprises performing an optical flow analysis and wherein the portable device and the optical sensor may assume varying orientations with respect to a user depending at least in part on how the portable device is being used;
   determining usage of the portable device based at least in part on the processed sequence of samples; and
   estimating a speed for the portable device based at least in part on the processed sequence of samples and the determined usage, wherein one or more techniques for estimating speed are selected from multiple techniques based on the determined usage.

2. The method of claim 1, wherein estimating speed includes determining a context for the portable device.

3. The method of claim 2, further comprising estimating a device angle with respect to a direction of motion.

4. The method of claim 3, further comprising determining the context of the portable device by assessing variance in a plurality of estimated device angles.

5. The method of claim 2, further comprising determining the context of the portable device by calculating an optical flow ratio.

6. The method of claim 2, further comprising determining the context of the portable device by comparing similarity between samples.

7. The method of claim 2, further comprising determining the context of the portable device by identifying a feature in the samples.

8. The method of claim 2, further comprising determining the context corresponds to being static.

9. The method of claim 2, further comprising determining the context corresponds to fidgeting motion.

10. The method of claim 8, further comprising estimating zero speed for the portable device based at least in part on the determination of being static.

11. The method of claim 9, further comprising estimating zero speed for a user corresponding to non-walking motion based at least in part on the determination of fidgeting motion.

12. The method of claim 1, further comprising estimating a device angle with respect to a direction of motion based at least in part on the processed sequence of samples.

13. The method of claim 12, further comprising determining a usage of the portable device based at least in part on the estimated device angle.

14. The method of claim 13, wherein determining the usage of the portable device is also based at least in part on an orientation determination using an inertial sensor.

15. The method of claim 13, wherein determining the usage of the portable device comprise determining if the usage is dangling, texting or calling.

16. The method of claim 1, wherein performing the optical flow analysis comprises aggregating estimations of pixel translations between the samples.

17. The method of claim 16, further comprising determining usage of the portable device corresponds to dangling motion based at least in part on the aggregated estimations of pixel translations.

18. The method of claim 17, wherein estimating the speed of the portable device is based at least in part on the aggregated estimations of pixel translations during half-cycles of arm motion.

19. The method of claim 18, wherein estimating the speed of the portable device is based at least in part on a value for user arm length selected from at least one of a value estimated from user dynamics, a predetermined average value and a user input value.

20. The method of claim 19, wherein the user dynamics are derived from a source of absolute navigation information.

21. The method of claim 17, further comprising determining an angle of the portable device in relation to a direction of movement based at least in part on the determination that usage of the portable device corresponds to dangling motion.

22. The method of claim 21, wherein determining the angle of the portable device in relation to the direction of movement is based at least in part on the aggregated estimations of pixel translations during complementary half-cycles of arm motion.

23. The method of claim 21, further comprising determining a velocity of the portable device based at least in part on the estimated speed and the determined angle.

24. The method of claim 16, further comprising determining usage of the portable device does not correspond to dangling motion based at least in part on the aggregated estimations of pixel translations.

25. The method of claim 24, further comprising determining an angle of the portable device in relation to a direction of movement based at least in part on the aggregated estimations of pixel translations, wherein determining usage of the portable device is based at least in part on an orientation determination using an inertial sensor and the determined angle.

26. The method of claim 25, wherein estimating the speed of the portable device is based at least in part on the aggregated estimations of pixel translations and the determined angle.

27. The method of claim 26, wherein estimating the speed of the portable device is based at least in part on a value for user height selected from at least one of a value estimated from user dynamics, a predetermined average value and a user input value.

28. The method of claim 27, wherein the user dynamics are derived from a source of absolute navigation information.

29. The method of claim 25, wherein estimating the speed of the portable device is based at least in part on an inclination angle of the portable device.

30. The method of claim 25, further comprising determining usage of the portable device corresponds to texting.

31. The method of claim 25, further comprising determining usage of the portable device corresponds to calling.

32. The method of claim 31, further comprising detecting that no turn has occurred.

33. The method of claim 31, further comprising detecting a ground feature in the sequence of samples.

34. The method of claim 25, further comprising determining a velocity of the portable device based at least in part on the estimated speed and the determined angle.

35. A portable device comprising:
an optical sensor, wherein the portable device and the optical sensor may assume varying orientations with respect to a user depending at least in part on how the portable device is being used; and
an optical navigation module, wherein the optical navigation module is configured to:
process a sequence of samples from the optical sensor of the portable device, wherein the processing of the sequence of samples from the optical sensor comprises performing an optical flow analysis;
determine usage of the portable device based at least in part on the processed sequence of samples; and
estimate a speed for the portable device based at least in part on the processed sequence of samples and the determined usage, wherein one or more techniques for estimating speed are selected from multiple techniques based on the determined usage.

36. The portable device of claim 35, wherein the optical navigation module is further configured to determine that usage of the portable device corresponds to dangling motion or does not correspond to dangling motion based at least in part on aggregated estimations of pixel translations between samples.

37. The portable device of claim 35, further comprising an inertial sensor, wherein the optical navigation module is further configured to determine an angle of the portable device in relation to a direction of movement based at least in part on aggregated estimations of pixel translations between samples, wherein determining usage of the portable device is based at least in part on an orientation determination using an inertial sensor and the determined angle.

38. The portable device of claim 35, wherein estimating the speed of the portable device is based at least in part on a value estimated from user dynamics.

39. The portable device of claim 38, wherein the value estimated from user dynamics corresponds to user arm length.

40. The portable device of claim 38, wherein the value estimated from user dynamics corresponds to user height.

41. The portable device of claim 38, further comprising a source of absolute navigation information wherein the user dynamics are derived from the source of absolute navigation information.

42. The portable device of claim 23, wherein the source of absolute navigation information includes any one or combination of the following:
(i) a global navigation satellite system (GNSS);
(ii) cell-based positioning;
(iii) WiFi-based positioning; or
(iv) other wireless-based positioning.

43. The portable device of claim 35, wherein the optical navigation module is further configured to determine an angle of the portable device in relation to a direction of movement based at least in part on aggregated estimations of pixel translations between samples and to estimate the speed of the portable device is based at least in part on the aggregated estimations of pixel translations and the determined angle.

44. The portable device of claim 35, further comprising an inertial sensor, wherein the optical navigation module is further configured to provide a navigation solution based at least in part on data from the inertial sensor and the estimated speed of the portable device.

* * * * *